May 26, 1959 D. H. PRITCHARD 2,888,514
COLOR TELEVISION
Filed Feb. 26, 1954 11 Sheets-Sheet 1

INVENTOR.
DALTON H. PRITCHARD

BY [signature]
ATTORNEY

May 26, 1959 D. H. PRITCHARD 2,888,514

COLOR TELEVISION

Filed Feb. 26, 1954 11 Sheets-Sheet 2

INVENTOR.
DALTON H. PRITCHARD

BY [signature]

ATTORNEY

INVENTOR.
DALTON H. PRITCHARD
BY [signature]
ATTORNEY

INVENTOR.
DALTON H. PRITCHARD
BY [signature]
ATTORNEY

May 26, 1959 D. H. PRITCHARD 2,888,514

COLOR TELEVISION

Filed Feb. 26, 1954 11 Sheets-Sheet 5

INVENTOR.
DALTON H. PRITCHARD

BY [signature]
ATTORNEY

INVENTOR.
DALTON H. PRITCHARD
BY [signature]
ATTORNEY

INVENTOR.
DALTON H. PRITCHARD
BY [signature]
ATTORNEY

INVENTOR.
DALTON H. PRITCHARD

BY [signature]
ATTORNEY

INVENTOR.
DALTON H. PRITCHARD

BY [signature]

ATTORNEY

INVENTOR.
DALTON H. PRITCHARD

BY [signature]
ATTORNEY

COLOR TELEVISION

Filed Feb. 26, 1954 11 Sheets-Sheet 11

INVENTOR.
DALTON H. PRITCHARD

BY

ATTORNEY

United States Patent Office 2,888,514

Patented May 26, 1959

2,888,514

COLOR TELEVISION

Dalton H. Pritchard, Princeton, N.J., assignor to Radio Corporation of America, a corporation of Delaware Application February 26, 1954, Serial No. 412,848

43 Claims. (Cl. 178—5.4)

The present invention relates to a method of providing improved performance of a color television receiver whereby the errors in the reproduction of scenes containing such colored objects of low saturation, such as flesh tones, hair, etc. which can take on a green or purple shading, are minimized or completely eliminated.

Color television is the reproduction on the viewing screen of a receiver of not only the relative luminescence or brightness, but also the color hues and saturations in the original scene. Luminance, hue and saturation form the three independent attributes of color vision. Luminance or brightness is more clearly explained in engineering terms by stating that it is the characteristic of colors that is transmitted by an ordinary black-and-white television system; brightness is that characteristic by means of which colors may be located in a scale ranging from black to maximum white. Hue is that characteristic by means of which colors may be placed in categories such as red, green, yellow, blue, and so on. Saturation represents the degree by which the color departs from a gray or neutral of the same brightness; for example, pale or pastel colors are much less saturated than those which are deep or vivid. Saturation may also be thought of as related to the physical purity or the amount of white light which is mixed or added to a hue.

It is well known that large areas of visual sensations of every brightness and hue are matchable or reproduceable by mixing lights of only three suitable primary colors, usually chosen as red, green, and blue. Matching by mixing three light stimuli provides in fact the basis of some important methods of measuring color. Full saturation in every hue however, is not reproduceable in this way with real primary lights. Once three actual primary lights have been chosen, no two of which can match the third, any color at all can be specified fully just by stating the amount of each primary needed to match that color. The luminance of a color is equal to the sum of the luminances of the primary required to match it. Chromaticity or color is fully specified by the fractional contributions of any two primaries to the total (the sum of all three such fractions must be exactly 1).

The electrical transfer of images in color may then be accomplished by additive methods. Color images may be transferred by electrically analyzing light from an object into not only image elements, as is accomplished by a normal scanning procedure, but also by analyzing the light from elemental areas of objects or images into selected primary or component colors and thereby deriving therefrom a signal representative of each of the selected component colors. A color image may then be reproduced at a remote point by appropriate reconstruction from a component color signal train. The signals which are transmitted in the system of color television transmission are those which conform to the so-called NTSC standards which were approved by the Federal Communications Commission on December 17, 1953. The precise nature of the color television signal will be discussed in greater detail in a latter portion of the specifications; but it is important to introduce here important concepts and philosophy which will serve as an introduction to the need and usefulness of the present invention.

The transmitted color television signal must satisfy numerous requirements. One of these requirements is that the transmitted signal should conform to criteria of compatibility, that is, that the signal produced by the color television system provide service to black-and-white receivers. It is then necessary to devise some method of producing a luminance signal from the output of the color camera.

By adding the signals from red, green, and blue camera tubes in proportion to the relative luminosities of the primaries, a luminance signal may be produced. The three primaries recommended as standards for color television do not appear equally bright because they are located in different parts of the spectrum, and hence stimulate the brightness sensation by different amounts. If the three primaries are mixed together in the right proportions to produce a white, it is found that the green primary which is located at the center of the visible spectrum accounts for 59% of the brightness sensation, while the red and blue primaries account for only 30% and 11% respectively. Therefore, a luminance signal is produced from the camera tube system which produces a brightness or Y signal equal to $$Y = .30R + .59G + .11B \qquad (1)$$

This signal should be generated in accordance with existing scanning standards, and be treated exactly like a standard monochrome signal with respect to bandwidth and the addition of synchronizing and blanking pulses.

Consider now the fundamental nature of the color signals. It is fairly clear that if a brightness or luminance signal is transmitted according to the relationship observed in the Equation 1, then the red, green, and blue signals required for the color kinescope may be provided by transmitting what might be called chominance or color difference signals namely $R-Y$, $G-W$, and $B-Y$. When considered in combination they indicate how each color in the televised scene differs from a monochrome color of the same luminance. However, it can be shown that these three chrominance signals are not independent, therefore when any two of them are known it is possible to solve for a third. For example, if, as follows from Equation 1

$$R-Y = .70R - .59G - .11B \qquad (2)$$

$$B-Y = .30R - .59G + .89B \qquad (3)$$

then it can be shown that the green color difference signal can be formed by utilizing the following relationship $$G-Y = .51(R-Y) - .18(B-Y) \qquad (4)$$

Departing for a moment from the engineering aspects of the color television signals involved, consider now some of the aspects of color area reproduction which have been found to be useful in the formulation of the NTSC standards. One of the most important contributions which was formulated at a very early stage of the research on color television transmission was the so-called "mixed highs" principle which was proposed by Alda V. Bedford and later discussed in his paper "Mixed Highs in Color Television" in the September 1950 issue of the "Proceedings of the IRE." Using the known principles that any color in a small enough patch well centered in the field of vision can be matched by mixing only two and not three primary colored lights, Bedford investigated the nature of observations which has been made at the RCA Laboratories on the sharpness of visibility of colored contrast edges. It became evident from the totality of the work cited that individual observers actually see somewhat differently from one another and that there is considerably wide disagreement as to the exact numerical details; however, there is full agreement on the general characteristic observed; i.e. if colored test objects are decreased in size, several factors happen in succession. First, blues become indistinguishable from grays of equal brightness and, second, yellows become indistinguishable from grays. On the whole, colors with pronounced blue loses blueness while colors lacking in blue gain blueness; all become less saturated with the still further decrease in size whereby reds merge with grays of equal brightness, and finally blue-greens also become indistinguishable from gray. Decreasing brightness like decreasing size also washes out colors but in less drastic fashion. For exceedingly small objects then normal visual sensations are devoid of all color connotations and only perception of brightness remains.

Television reproduction on a full three-color basis for all details of all objects, regardless of sizes, thus seems to be a thoroughly wasteful process. And it follows that color transmission should have the following properties: (A) Dominant wavelength, purity and luminance data should also be transmitted for homogeneous color patches subtending relatively large areas at the eye; (B) Only purity within reduced limits and luminance information need be transmitted for quite small color details; (C) Only luminance information need be transmitted for the finest detail. Recognition of the mixed highs principle was the first step which was made in the more adequate utilization of the color television signal for optimum color picture reproduction at a color television receiver.

In the final formulation of the NTSC signal, two other concepts were used. Following the teachings of David G. C. Luck as taught in his copending U.S. patent application entitled "Color Television," Serial No. 223,021, filed April 26, 1951, now U.S. Patent No. 2,811,577, granted October 29, 1957, it was recognized that because of the acuity of the eye, it is more advantageous to transmit color information for color areas of intermediate size or at color boundaries along an orange-cyan color axis with the large areas being described by full three-color information.

In order to utilize the advantages of the orange-cyan axis, which, as has been described, accounts for the acuity of the eye in regions of intermediate size, it is more advantageous to transmit so-called I and Q signals rather than the color difference signals as described by Equations 2 and 3; the I signal being a wide band or high definition signal along what is principally the orange-cyan axis, and the Q signal being principally a green-purpose signal having narrow band or low definition. It has been shown experimentally that the NTSC method which utilizes the Y, I and Q signals is a highly efficient method of transmitting color television images satisfying both criteria of compatibility, spectrum bandwidth and utilizing the principles of mixed highs and the known properties of the eye, by use of optimum parcels of signal information. It must be remembered that in general, very little has been known about the processes of human vision; these processes occurring partly in the eye and partly in the brain which connects the stimulus of physical light output from some object to the conscious sensation experienced by a person observing that object. Though vision is by no means understood, many facts about it have been found by experiment and some of these are the most significant guides for color television. For example, the eye is very easily satisfied as to the accuracy of color reproduction as derived from the degree of saturation. In many cases it should be remembered that the eye has no previous information with which to make an exact comparison. If the color television receiver should show a departure in the saturation level representing a scene or a portion of a scene at the studio, the eye may be actually quite willing to accept this departure.

Now that color television is no longer in a strictly experimental stage, a great many new problems associated with both human vision and the transference of color information are being encountered. One of these problems deals with the transmission of colors such as flesh tones. As has been mentioned, if the precise shade or saturation of blue of a sky is not accurately represented on a color television receiver screen, the deviation from the actual color saturation will cause little or no response from the eye of the viewer. However, it has been observed that scenes containing colored objects having a low degree of saturation such as flesh tones produce most obvious psychological errors in color reproduction when the errors lie in the purple-green direction. Green or purple shading in flesh tones and hair, for example, are immediately noticeable to the average observer, whereas variations along the orange-cyan axis are not nearly so apparent. The system at present takes advantage of this fact in that large area three-color reproduction is provided via narrow band information to the receiver whereas relatively wide band information is provided along the preferred orange-cyan axis; this yields adequate color resolution to the color edges or boundaries. The present invention to be described continues to provide this optimum edge color reproduction in the normal manner, but in addition it provides two-color reproduction along the same preferred orange-cyan axis for objects having a low degree of saturation. This has the effect of minimizing or reducing the green-purple tints in such things as faces and hair and renders the reproduced color television image more acceptable to the home viewer.

The object of this invention is therefore to provide improved performance of a color television receiver operating from signals transmitted in accordance with the NTSC television signal specifications.

It is also an object of this invention to provide a means for decreasing green-purple errors in color television image reproduction.

It is still another object of this invention to provide two-color reproduction along an orange-cyan axis for objects having a low degree of saturation in a transmitted color television image.

It is still another object of this invention to provide in color television transmission an automatic amplitude control of the Q signal as related to the degree of saturation of a particular region of the television image.

It is yet another object of this invention to relate the amplitude of the Q signal in a color television receiver to the ratio of the luminance signal amplitude and the color subcarrier signal amplitude.

It is still another object of this invention to relate the amplitude of the Q signal channel response to the true saturation resulting from a division of the chrominance signal by the luminance signal.

It is still a further object of this invention to provide a system in color television reproduction wherein there is no color in areas of very low saturation, orange-cyan is the dominant color in areas of relatively low saturation, and there is normal three-color representation in areas of normal saturation.

It is yet another object of this invention to provide two-color reproduction in low saturation areas in a reproduced color television image.

It is another object of this invention whereby flesh tones in a reproduced color television image will be reproduced by principle utilization of the orange-cyan axis so that a green-purple tint error may be minimized.

It is a further object of this invention to enhance the color fidelity of a reproduced color image by controlling the gamut of colors utilized in the production of the color image in proportion to the level of color saturation.

According to the invention, the human eye is adequately satisfied as to the color fidelity of a reproduced image, regardless of bandwidth, if the gamut of colors utilized to reproduce the image is caused to vary in accordance with the degree of color saturation, and various in direction of increasing, or widening, the gamut with increasing color saturation.

In one form of the invention as applied to color television signals conforming to NTSC standards, the obvious psychological errors in color reproduction of such colored objects as flesh tones and hair having a low degree of saturation are minimized by controlling the amplitude of the Q signal component. Utilizing a suitable degree-of-saturation detector, the output of the Q channel is caused to be either proportionately reduced or completely cut off when an object having low color saturation is being scanned, and is restored to normal operation when the degree of saturation exceeds a certain predetermined value.

Other and incidental objects and advantages of this invention will become apparent upon a reading of the following specifications and an inspection of the accompanying drawings in which.

Figures 15, 16:
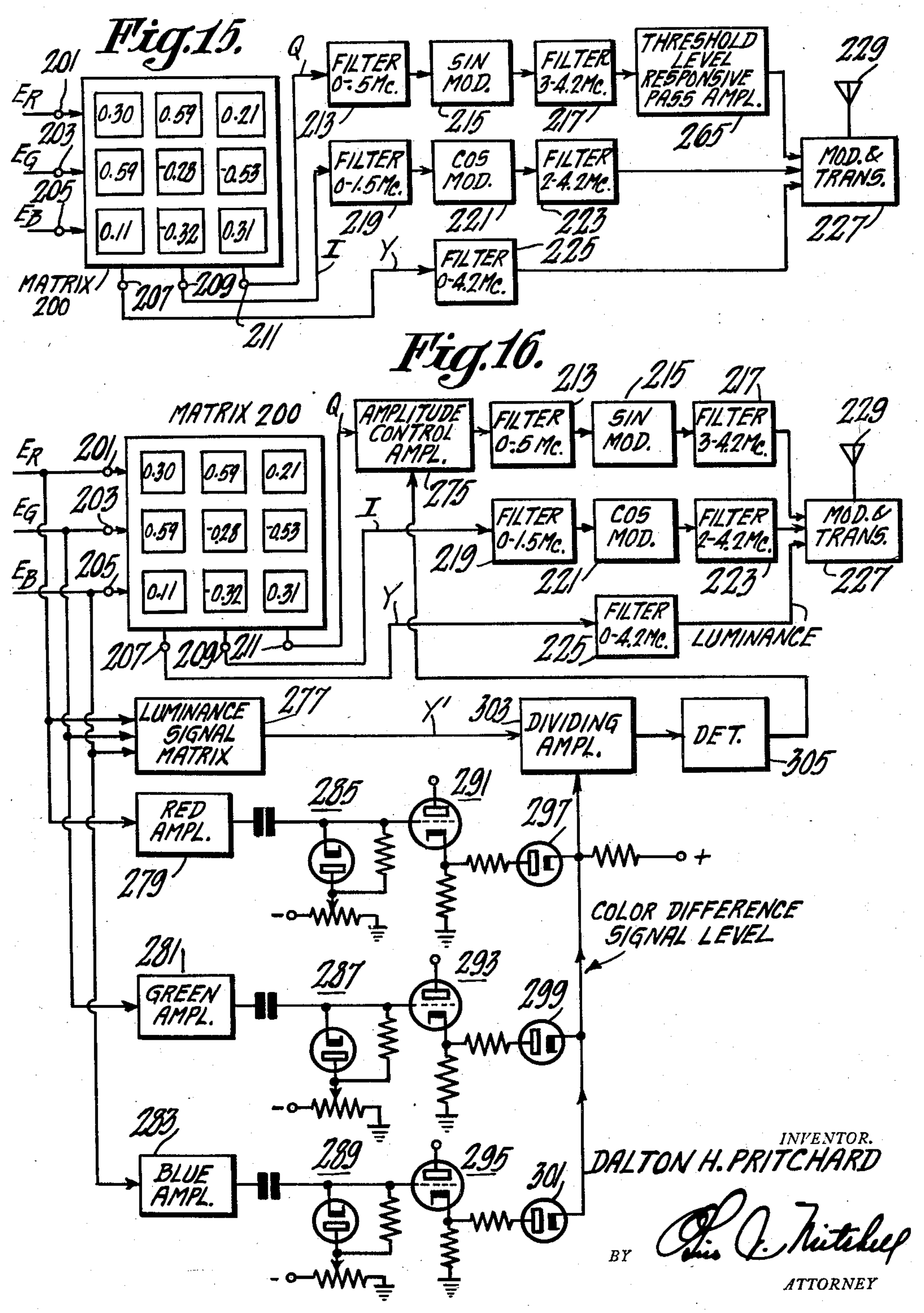

Figure 15 shows an application of the present invention to color television transmitter circuitry which involves a threshold-level-responsive pass amplifier in the Q channel; and Figure 16 shows a form of the present invention as applied to color television transmitter circuitry which utilizes a color difference signal level as related to a luminance signal for determining the color saturation level, this color saturation level then being used to control the Q channel output.

In the formulation of the NTSC signal specifications the very important contributions of namely, the principles of mixed highs as taught by Bedford and the usage of the orange-cyan axis as taught by Luck, have played an important part. However, as has been shown, these contributions deal principally with eye acuity and detail in addition to the normal considerations of resolution and faithfulness of color reproduction.

The present invention will, therefore, be seen to teach a philosophy new to color television signal transmission concepts and formulation. Whereas as has been described, the NTSC signal specifications are designed to cope with the problems of acuity and detail, the present invention deals with neither area nor edge concepts but with the problems of accuracy of color reproduction in areas of low saturation. Basically the fundamental philosophy of the present invention may be summed as follows: In areas of very low saturation no color detail is involved; this actually conforms to the basic concepts of the mixed highs principle. In areas of low saturation the color detail is to be supplied principally by color information along the orange-cyan axis and in areas of normal saturation color information based on all three primary colors is to prevail. As has been mentioned earlier in the specifications, the present invention will have considerable application in reducing the green-purple errors which occur in the color reproduction of objects having a low degree of saturation such as flesh tones, hair, etc., and so on.

Figure 1:
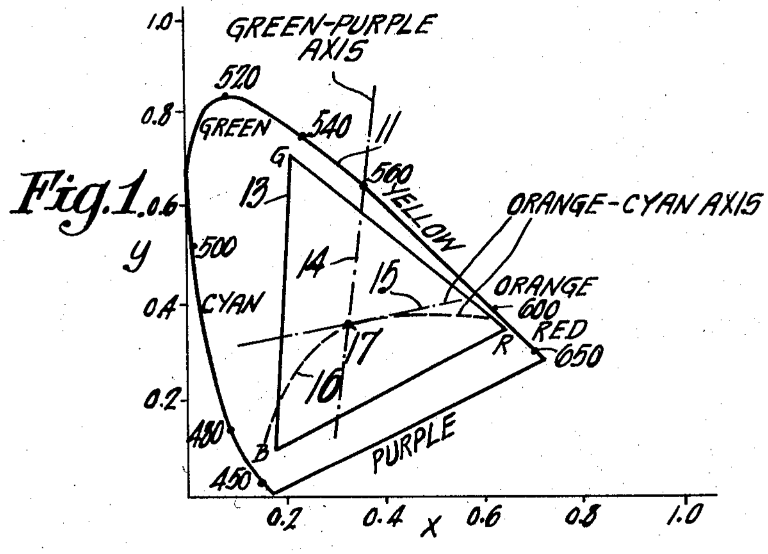
Figure 1 shows a chromaticity diagram describing the locus of the visible spectrum and the color triangle associated with the reproducer primaries as chosen by the NTSC.

Before turning to the embodiments and circuitry associated with the present invention, consider first the nature of the color and the color signals which are involved. Figure 1 shows a chromaticity diagram describing the gamut of colors of the visible spectrum and includes the color triangle associated with the reproducer primaries as chosen by the NTSC. It shows how the colors of all spectral lines plot as an inverted horseshoe curve with its open end closed by the non spectral purples. The numbers spotted along the horseshoe are wave lengths in millimicrons. White is a general term for a light which evokes an achromatic or colorless sensation. The point 17 located at the central region of the chromaticity diagram is CIE Illuminant C and yields a white depending upon particular adaptation conditions of the observer.

The hue of a color is related to its dominant wave length. After selecting a standard white the hue of any color can then be expressed by the direction from the point representing the color from the white point on the chromaticity diagram. Similarly the saturation sensation given by any color is related to its purity which is represented by the distance along the radius from the white point to the point representing that color as mentioned as a fraction of the total distance out to the spectrum locus along that same radius. Chromaticity is fully given by just two numbers, either $x$ or $y$ or angular and fractional radius, and to give any additional number conveys no further chromaticity information. Of course, a third number is needed to specify brightness or physical luminance, but that is a separate matter.

Given any real set of primaries such as the phosphor colors used in reproducing color pictures by television, they can be plotted on the diagram as indicated by the points of the triangle 13. The selected achromatic point at 17 actually represents CIE Illuminant C. Three further facts are to be noted. One is that three strongly colored real primaries with intensity proportioned to give a good white when mixed appear differently in brightness when viewed separately; this fact is, of course, the basis of Equation 1. The second is that the apparent visual difference between adjacent patches of different colors becomes least apparent when they appear equally bright. And thirdly, in a small patch well centered in the field of vision, the color can be matched by mixing only two primary colored lights whereby the chromaticity diagram then becomes merely a straight line, such as, for example, the orange-cyan axis 15 which will be of interest in the text to follow.

One point must be stressed in connection with the orange-cyan axis 15 shown in Figure 1. If a three-color reproducer is used to form a two-color signal then the actual orange-cyan axis will be somewhat like that of the curved path 16; this is actually an advantage since it will provide deeper reds and also deeper blues.

As has been demonstrated by Figure 1 and as has been described in connection with Equations 2, 3, and 4, it is necessary to send only two color signals.

The actual transmission of any two component color signals is accomplished in a simple and ingenius fashion by using a modulated color subcarrier. The color subcarrier frequency is chosen at 3.579 mc. and the need for two carrier frequencies can be eliminated by the use of the two-phase modulation technique which is equivalent to the use of two carriers of the same frequency but at a phase separation of 90°. At the receiver, the information contained in the two-phase modulated subcarrier can be easily recovered by the processes of synchronous detection, that is, the beating of the modulated subcarrier with two locally generated subcarrier signals of proper phase. Since the locally generated subcarrier signals must be accurately synchronized with the transmitter, a synchronizing burst of at least 8 cycles of subcarrier frequency at a proper phase is transmitted on the back porch interval following each horizontal synchronizing pulse.

Figure 2:
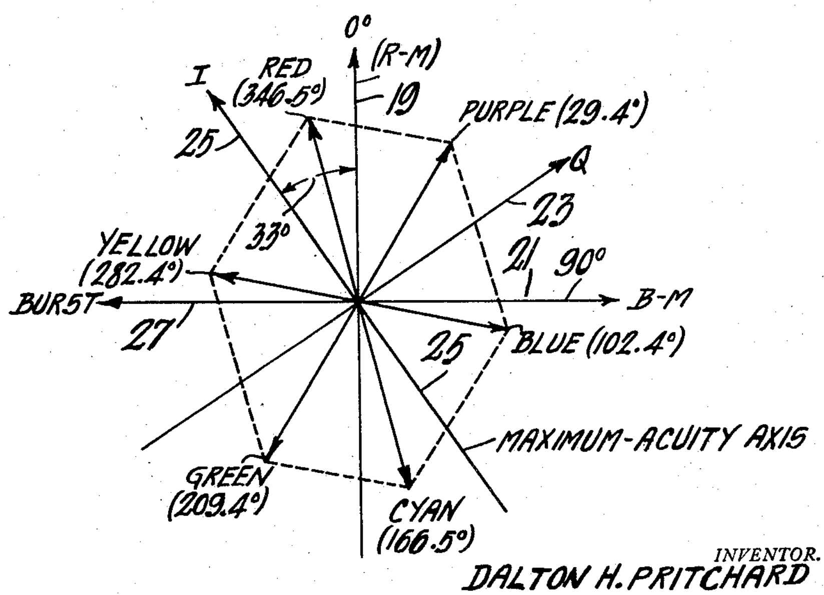
Figure 2 shows a vector diagram of the relative amplitudes and phases for the various hues which may be incorporated into a color television subcarrier signal.

Consider now the vector diagram shown in Figure 2. The phase of the angle gives a good indication of hue while the subcarrier amplitude when considered along with the corresponding luminance level gives an indication of saturation. White or neutral colors fall at the center of the diagram since these produce no subcarrier component. Any chrominance or color difference signal corresponds to an axis or line of this vector diagram. For example, the $R-Y$ and $B-Y$ correspond to the axes lines 19 and 21 respectively. As has been mentioned, extensive experiments at the RCA Laboratories have indicated that the eye has greatest acuity for color difference signal information corresponding to the axes displaced from the $R-Y$ axes by 33°. This axis 25 corresponds to colors ranging from orange to cyan. In the present color television system, the I signal corresponds to the orange-cyan axis while the Q component corresponds to the axis with right angles to this or the axis 23. This change in angle to these axes which accounts for eye acuity produces no great problems when it comes to signal transmission since it can be shown that I and Q can be explained in terms of the red, blue and color difference signals by the equations $$I=.74\ (R-Y)-.27\ (B-Y) \quad (5)$$

$$Q=.48\ (R-Y)+.41\ (B-Y) \quad (6)$$

It is also possible to solve the equations relating the I and Q signals and the red and blue color difference signals to show how the red and blue color difference signals can be reconstructed by appropriate values of the I and Q signals, namely $$R-Y=.96I+.62Q \quad (7)$$

$$B-Y=-1.10I+1.70Q \quad (8)$$

The green color difference signal can be recovered by cross mixing I and Q signals directly according to the equation $$G-Y=-.281-.64Q \quad (9)$$

Figure 3:
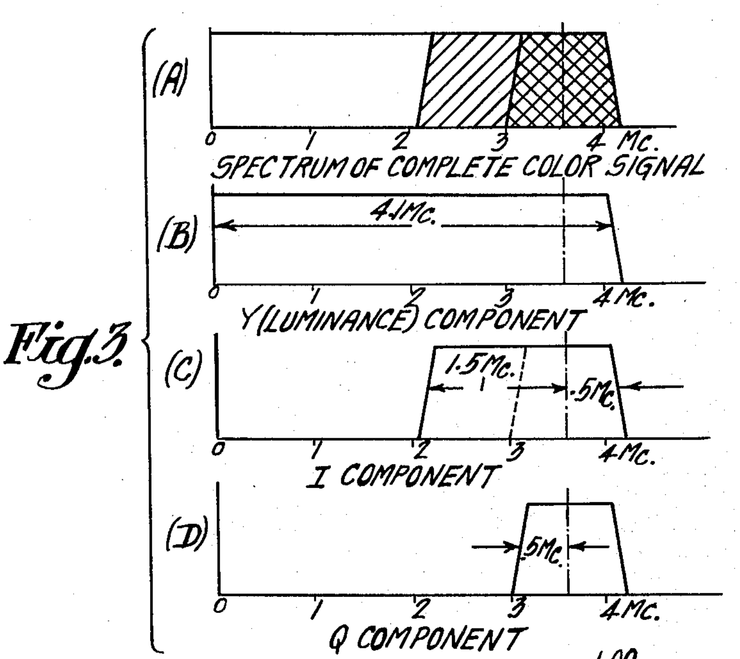
Figure 3A shows the spectrum of a complete color signal.
Figure 3B shows the spectrum of a luminance component.
Figure 3C shows the spectrum of the I component.
Figure 3D shows the spectrum of the Q component.

Consider now the problems attendent with the transmission of the I and Q signals on a color subcarrier having a frequency of 3.579 mc. Figure 3A shows the spectrum of a complete color signal showing that the overall spectrum must be contained in a region of approximately 4.1 mc. as shown in Figure 3B. Note that if the color subcarrier is to be subjected to modulation and if double sidebands are to be developed, that the region available for double sidebands extends only about ½ mc. above the frequency of the color subcarrier. This places an upper limit on the side frequency energy but notice that it does not necessarily place a lower limit on the side frequency energy since, as is shown in Figure 3A, a region down to around 2 mc. is available for the lower side frequencies. Below 2 mc. these side frequencies would interfere with the luminance signal and would also impose certain filtering problems. The Q component is a signal which is principally along a green-purple axis and according to the teachings of Luck does not play an important part in edge resolution; therefore, it is assigned the bandwidth as shown in Figure 3D; namely double sideband operation with an upper limit of approximately ½ mc. in either direction from the color subcarrier frequency. The I component, or orange-cyan component, is the component which supplies edge definition. Since it cannot have color side frequency information about 4.1 mc., the I signal is, therefore, double sideband for color components of up to ½ mc. and single sideband for color components from approximately ½ mc. to 1½ mc. which, therefore, yields the I component spectrum bandwidth shown in Figure 3C. The single sideband information is a very necessary part of the I signal since should this signal be reduced in bandwidth, then the boundary and edge regions on color television pictures, which are described principally by the orange-cyan two color line, will then undergo some deterioration in resolution.

Figure 4:
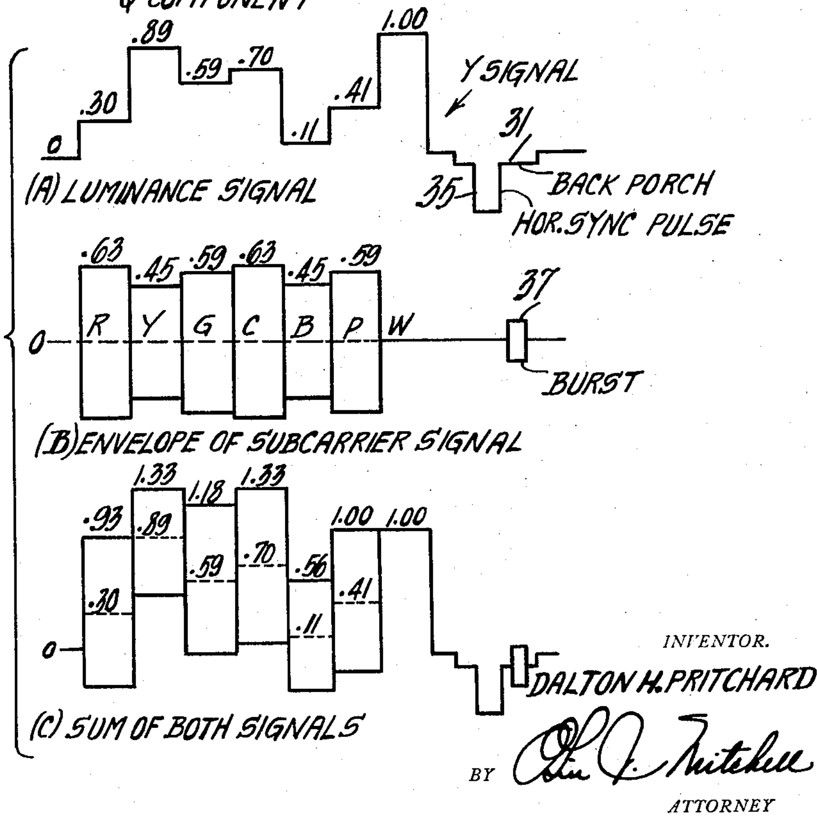
Figure 4A shows a typical luminance signal.
Figure 4B shows an illustrative envelope of a subcarrier signal.
Figure 4C shows the sum of the signals described in Figures 4A and 4B.

Figure 4 shows some details of the nature of the color television signal which will provide useful concepts for further understanding the present invention. Figure 4A shows the luminance signal wherein the luminance signal has various amplitudes as a function of time; included are the horizontal synchronizing pulse 35 and the back porch 31. Figure 4B shows the envelope of the subcarrier signal wherein the various envelopes for various colors indicated correspond to various amplitudes and phases thereby describing hues and saturations respectively. Note the burst 37 which is located on the back porch of the horizontal synchronizing pulse. Figure 4C shows the sum of both signals showing the envelope of the subcarrier signal superimposed on the various amplitudes representing the luminance signal for various time intervals.

A factor which will be of considerable usage in the descriptions to follow will be that which describes the degree of saturation. There are several methods for describing the degree of saturation. One is a very accurate one and is that which describes the division of the chrominance signal by the luminance signal. A more approximate approach but one still highly satisfactory is that which uses a direct measure of the amplitude of the chrominance signal. Though this does not give the true saturation, it has been satisfactory in experimental work and will be considered as a highly useful adjunct to the approach describing true saturation which involves the luminance signal. Other approximate methods utilize the ratio $Q/Y$ and the ratio of the difference in color brightness between the brightest and the weakest color primary and the luminance signal.

Figure 5A:
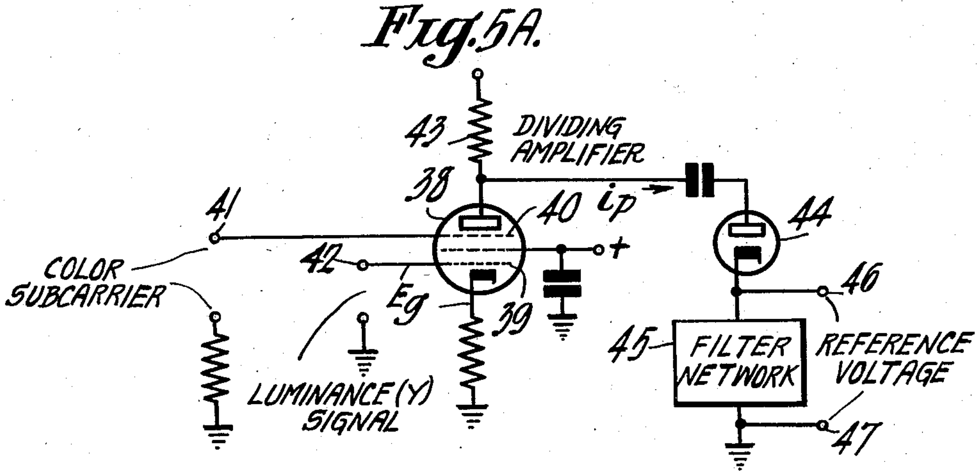
Figure 5A shows a dividing amplifier and filter detector circuit.
Figure 5B:
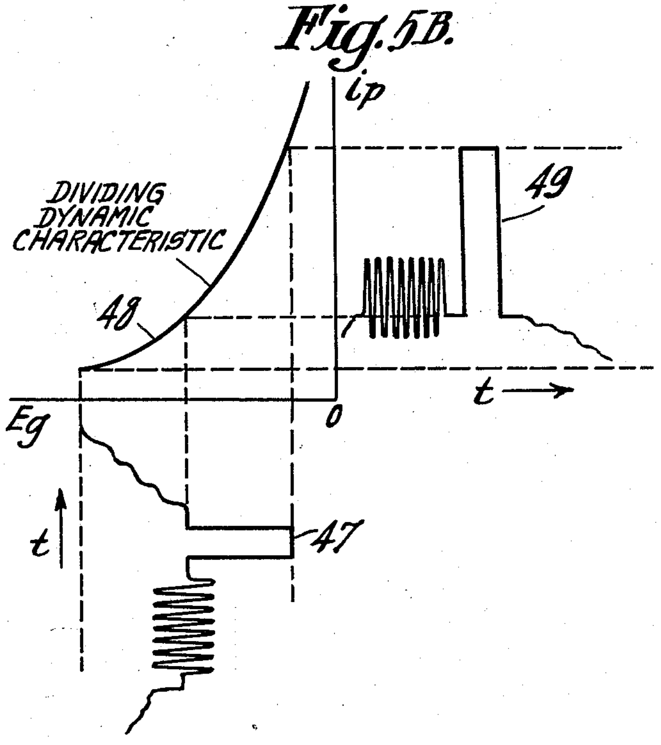
Figure 5B shows the dividing dynamic characteristic curve of a dividing amplifier.

Before turning to considerations of the present invention, it is instructive to consider first the detailed operation of what is known as a dividing amplifier. A dividing amplifier circuit is shown in Figure 5A. This circuit involves a pentode 38 which is so biased as to produce the dividing dynamic characteristic 48 shown in Figure 5B. Any signal, therefore, applied to this dividing characteristic 48 such as signal 47 which is a grid voltage as shown will undergo the action of division and yield an output similar to that which has been afforded the output signal 49. It should be emphasized that the dividing action in no way refers to frequency division, but merely to the transfer characteristic of the signal which is applied at the input of the pentode 38. Therefore, if the luminance signal (which is to experience a $$\frac{1}{Y}$$

characteristic in the dividing amplifier) is applied to the grid 39 and if the pentode 38 is adjusted for dividing action, then division of the luminance signal will take place in the amplifier tube. If the color subcarrier is applied to, for example, the suppressor grid 40, then multiplication will take place between the color subcarrier and the luminance signal. If the color subcarrier is designated, for example, by "A," then it is evident that the signal appearing across the output resistor 43 will be of the form $A/Y$ which is the characteristic which was desired. If the divided signal is then applied through the diode 44 to the filter network 45, detection of this divided signal can take place to yield a reference voltage across terminals 46 and 47 which is proportional to the amplitude of the output signal having the characteristic $A/Y$.

Figure 6:
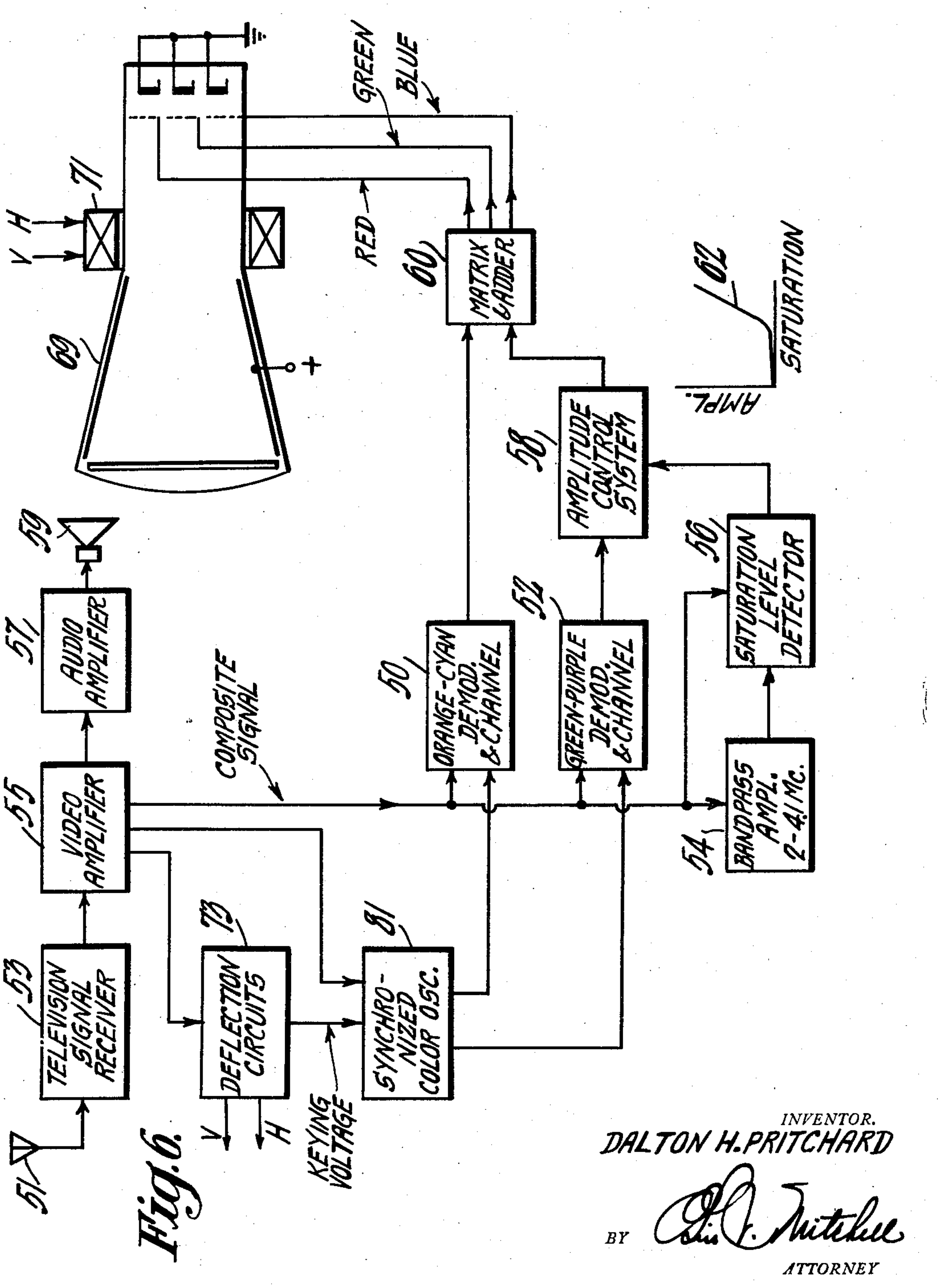
Figure 6 shows the block diagram of one version of the present invention which relates the green-purple axis demodulator channel amplitude to the saturation level.

Consider now a fundamental version of the present invention which is embodied in the block diagram of the television receiver shown in Figure 6. Here the incoming color television signal is impressed upon the antenna 51 and applied to the television signal receiver 53. The television signal receiver 53 performs the functions of demodulation and recovery of the complete video signal with prescribed fidelity. The usual method of demodulation and recovery of the video signal is to utilize a superheterodyne circuit wherein the incoming signal is subjected to the processes of radio frequency amplification, first detection, intermediate frequency amplification, and second detection not to mention the processes of automatic gain control, automatic frequency control and other functions which are normally required of commercial television receivers. For a description of the fundamentals associated with the superheterodyne type of color television receiver, see, for example, the discussion by Antony Wright entitled "Television Receivers" in the March 1947 issue of the "RCA Review."

Once the complete television signal has been recovered, it is applied to the video amplifier 55; the sound portion of the signal is separated from the video portion by use of one of many methods, one of which is the well known principle of intercarrier sound; the sound signal is then applied to the audio amplifier 57 and then to the loud speaker 59. Another branch of the video amplifier separates the synchronizing information from the video signal and applies it to the deflection circuits 73 which applies appropriate vertical and horizontal deflection signals to the yokes 71 in addition to such functions as high voltage for the color kinescope 69 and a keying voltage which may be used for separating the synchronizing burst from the video signal. The video signal also issues from the video amplifier 55 and is applied to the synchronizing color oscillator 81 where using the keying voltage from the deflection circuits 73, the synchronizing burst is caused to control the local color signal source in a phase prescribed by the color synchronizing burst. The composite signal is then applied to two channels as shown. One is the orange-cyan demodulator and channel 50 which receives a properly phased color oscillator signal from the synchronized color oscillator 81; the other is denoted as the green-purple demodulator and channel 52 which also receives an appropriately phased signal from the synchronized color oscillator 81. In the orange-cyan demodulator and channel 50, the color subcarrier is subjected to the process of synchronous detection to recover the orange-cyan axis information which is then passed through an appropriate filter and then combined with the luminance signal to produce not a color difference signal but an actual orange-cyan axis color signal. In like manner the green-purple demodulator and channel 52 separates the green-purple axis information from the video signal by use of the processes of synchronous detection. The green-purple signal information is then passed through an appropriate filter and combined with the luminance signal to yield a green-purple axis signal. This green-purple axis signal is passed through the amplitude control system 58 where it is passed on to the matrix and adder 60 which also receives the orange-cyan axis information from the orange-cyan demodulator and channel 50. In the matrix and adder 60, the red, green, and blue component color signals are formed by proper combination of the orange-cyan information and the green-purple information; the red, green, and blue signals are then impressed on appropriate grids of the color kinescope 69.

Consider now the action of the amplitude control system 58 and its control circuit made up of the band pass amplifier 54 and the saturation level detector 56. Note that the composite video signal is passed through the band pass amplifier 54 which, having a pass band from 2 to 4.1 mc. yields principally the modulated subcarrier portion of the video signal. Note too that the composite signal which contains the luminance signal is impressed directly on the color saturation level detector 56. In the saturation detector 56 the degree of saturation level is determined, whether it be a true degree of saturation which represents the division of the chrominance signal by the luminance signal or whether it be an approximation measure. The output of the degree of saturation level detector 56 is therefore a suitable signal having a level which is related to the saturation level. This signal is used to control the amplitude control system 58 in accordance with the curve 62. It then follows that when the degree of saturation is low, the green-purple axis information as supplied to the matrix and adder 60 is reduced or eliminated completely, and when the saturation exceeds a predetermined value, the information from the green-purple axis demodulator and channel 52 is furnished at full level to the matrix and adder 60. The amplitude control system 58 might be in the nature of a switch which operates at a given degree of color saturation or more possibly a nonlinear characteristic which results in compressing the output signal in low color saturation objects and expanding the output in highly saturated objects. This control is applied to the green-purple axis demodulator output only and thereby causes the gamut of colors reproduced to change from three colors in saturated areas to two colors (along the preferred orange-cyan axis) in low saturated areas thus removing the green-purple errors which might exist in flesh tones, hair, background, and so on. The overall phase accuracy requirements are reduced also since the visible errors due to misphasing of the receiver which cause flesh tones to become green or purple are removed and comparatively large errors in the orange-cyan direction can normally be easily tolerated.

Figure 7:
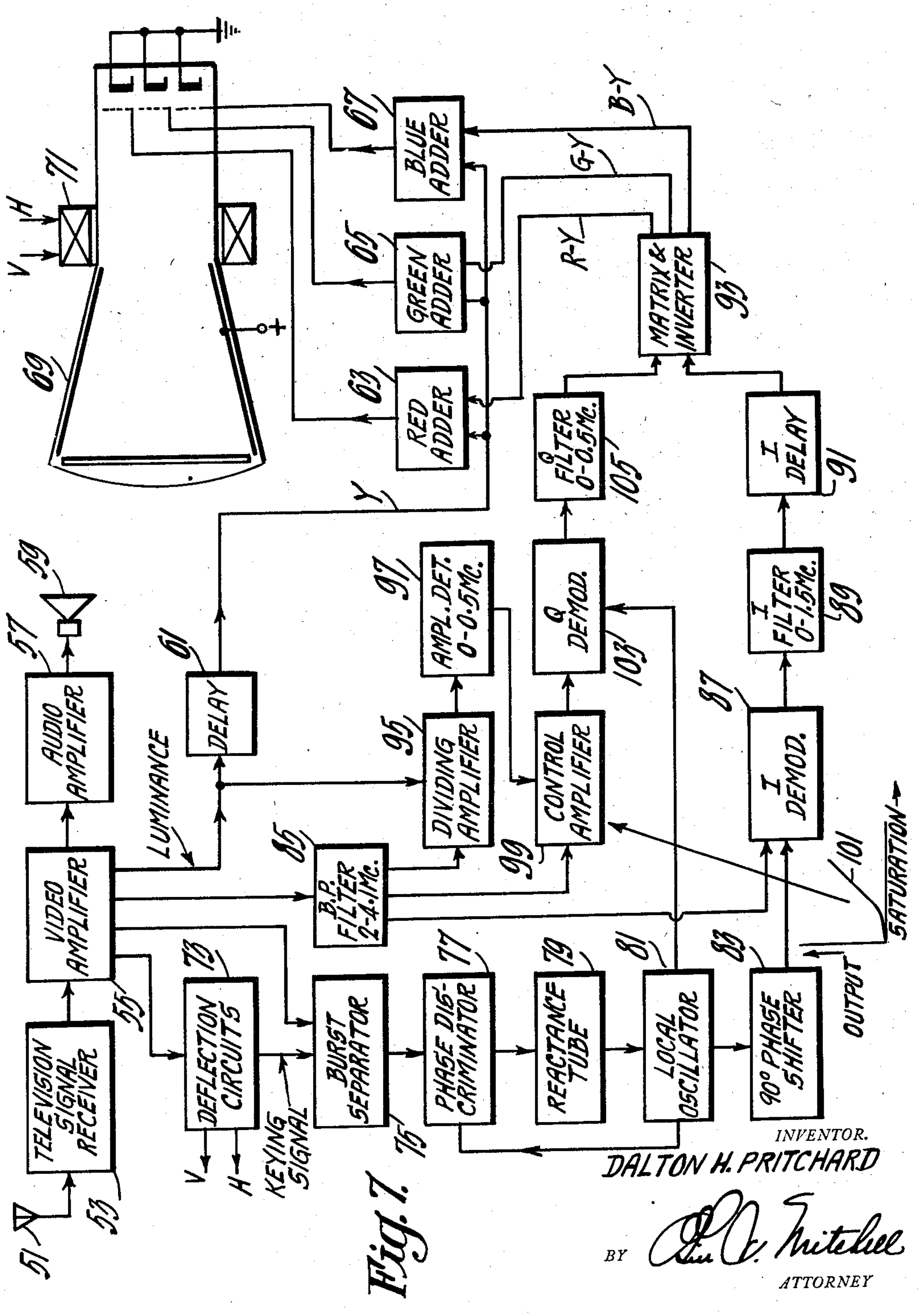
Figure 7 shows another version of the present invention wherein saturation control and amplitude control is provided prior to the Q demodulator.

Figure 7 shows a block diagram of a form of the present invention. Here the incoming video signal, upon being impressed on the antenna 51, proceeds to the video amplifier 55 and to the loud speaker 59 in the same manner as that described in connection with the circuit in Figure 5. Consider now the circuits in more detail which are concerned with the luminance and chrominance information. It is seen that the luminance signal is delivered to the delay line 61 and then applied to the red adder 63, the green adder 65, and the blue adder 67 where it will eventually be combined with the correct color difference signals delivered by the matrix and inverter circuit 93 so that the proper red, green, and blue signals will be applied to the proper control grids of the color kinescope 69. The color synchronizing information is applied to the burst separator 75 which is keyed by the deflection circuit 73. The separated burst is then impressed on the phase detector 77. At the same time, the local oscillator whose output frequency is that of the synchronizing burst, delivers a signal to the phase discriminator 77. The phase of the separated burst and the local oscillator signal are compared there and an error voltage is delivered to the reactance tube should a phase difference occur, this error voltage causing the reactance tube 79 to return the phase and frequency of the local oscillator 81 to coincide with that prescribed by the burst. The local oscillator then delivers a synchronous detection signal to the Q demodulator 103 and by passing a signal through the 90° phase shifter 83 the local oscillator also delivers a synchronous signal to the I demodulator 87, this signal being in quadrature with that delivered to the Q demodulator 103.

The chrominance signal is then applied to the band pass filter 85 which removes those signal components which are not in the range from 2 to 4.1 mc. One branch of the output from the band pass filter 85 is delivered to the I demodulator 87 where by the processes of synchronous detection the I signal is recovered. This signal, which represents orange-cyan information, is then passed through the I filter 89 which has a pass band from 0 to 1.5 mc. The output of the I filter is then passed through the I delay line 91 and impressed on the matrix and inverter circuits 93.

Another branch issuing from the band pass filter 85 is that branch which feeds the control amplifier 99 which determines how much of the chrominance signal shall be applied to the Q demodulator 103. Synchronous detection is employed in the Q demodulator 103 to permit the recovery of the Q signal from the signal reaching this circuit. The recovered Q signal which contains the green-purple axis information is then applied to the Q filter 105 which has a pass band from 0 to ½ mc. thereby eliminating the higher components due to the single sideband information which has been transmitted to extend the bandwidth of the I signal. The Q signal is then applied to the matrix and inverter circuit 93 where in conjunction with the I signal, the color difference signals are produced which, as has been described, are applied to the appropriate adder circuits where they are combined with the luminance information and then applied to the proper control grids of the color kinescope 69.

Note the dividing amplifier 95. Here a ratio or a division of the chrominance signal by the luminance signal is established so that the true saturation can be measured. The output of this dividing amplifier is then passed through an amplitude detector circuit 97 which has a pass band from 0 to ½ mc.; the output signal from the amplitude detector circuit 97 is then used to control the control amplifier 99 in accordance with the curve 101 so that when the saturation level is sufficiently low, the chrominance information entering the Q demodulator is minimized or omitted; when the saturation level is high then the control amplifier delivers the full chrominance information to the Q demodulator and the Q channel supplies a full Q signal to the matrix and inverter circuit 93. It is to be noted that if only a fair approximation is required, that the dividing amplifier might be so designed as to operate from a direct measure of the amplitude of the chrominance signal only.

Figure 8:
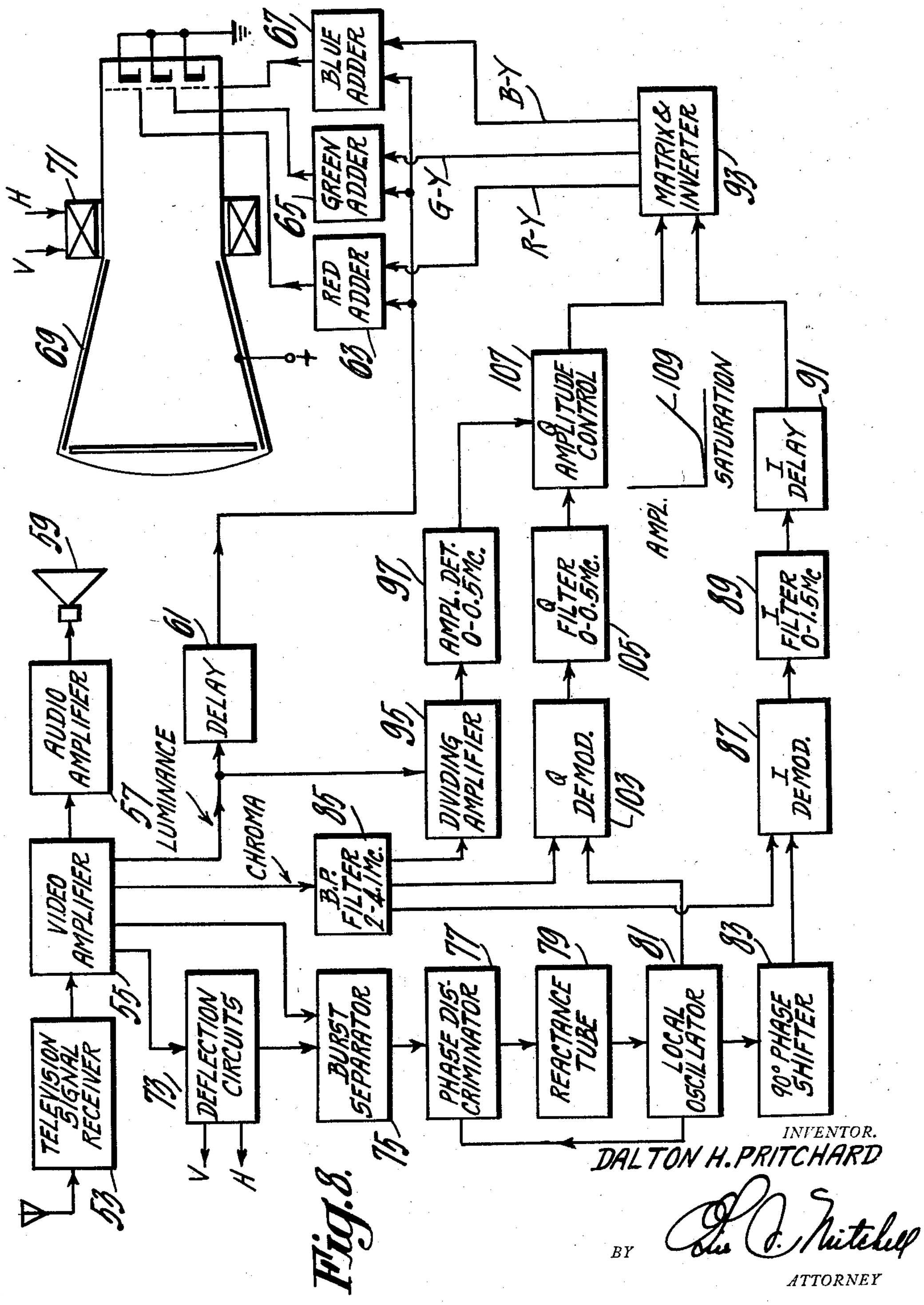
Figure 8 shows another version of the present invention wherein Q signal amplitude control is provided following the Q demodulator and Q filter.

Figure 8 shows another version of the color television receiver circuit described in Figure 7. The behavior of the incoming television signal after reaching the antenna 51 is identical to that described in connection with Figures 5 and 6 up to the video amplifier 55. The behavior of the audio signal, the luminance signal, and the synchronizing information is that described in connection with Figure 7. As in Figure 7, the chrominance information in the circuit in Figure 8 is impressed on the band pass filter 85 which eliminates all signal components not in the pass band from 2 to 4.1 mc. With the output of the band pass filter fed to the I demodulator 87 in which the recovery of the I signal is effected, this I information is then being passed through the I filter 89 and the I delay line 91 to the matrix and inverter circuit 93. The chrominance information issuing from the band pass filter 85 is now passed directly to the Q demodulator 103 wherein the Q information is recovered. The information, representing information along the green-purple axis is passed through the Q filter 105 and impressed on the input of the Q-amplitude control circuit 107. By utilizing the dividing amplifier 95 and the amplitude detector 97 as described in connection with Figure 7, the Q amplitude control circuit 107 may be made to vary the amplitude of the filtered Q signal prior to the signal being impressed on the matrix and inverter circuit 93—this variation of amplitude conforming to, for example, the curve 109.

The circuit in Figure 8 differs from that in Figure 7 only in that the amplitude of the Q signal is controlled after it has been filtered rather than by resorting to the control of the chrominance information prior to injecting this information into the Q demodulator.

In another form of the invention, the Q information may be subjected to control immediately after demodulation and before or during filtering. This has certain circuit-simplifying advantages since the amplitude control circuit can be made an integral part of either the synchronous detector circuit or the Q-filter amplifier circuit without the necessity of complex circuitry.

Figure 9:
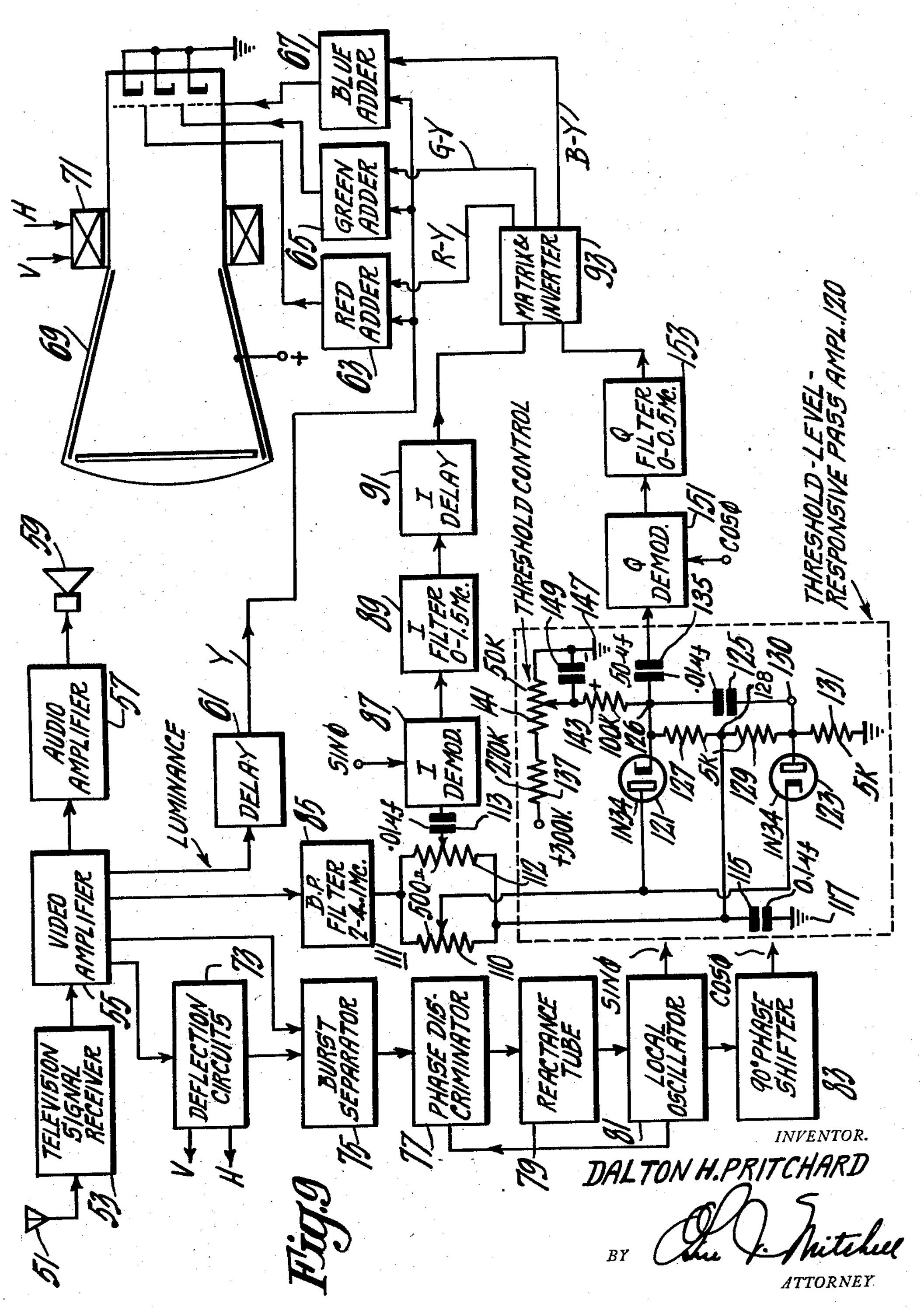
Figure 9 shows still another version of the present invention wherein the amplitude of the Q channel signal is controlled by using a direct measure of amplitude of the chrominance sub-carrier signal.

Figure 9 shows another version of the present invention which uses a direct measure of the amplitude of the chrominance signal rather than the true saturation resulting from a measure of the ratio of the chrominance signal and the luminance signal. The embodiment in Figure 9 shows an actual circuit which has been constructed and tested and which has given satisfactory results. The recovery of the video signal by the television signal receiver 53 and its deployment from the video amplifier 55, to the audio amplifier 57, to the delay line 61, and to the local oscillator and to the burst separator 75 is identical with that described in connection with Figures 7 and 8. Here too the video information is impressed on the band pass filter 85 which eliminates those frequency components which lie outside the range from 2 to 4.1 mc. The chrominance signal is now caused to form across the two potentiometers 110 and 112 which form the combined control circuit 111. An appropriate amount of the chrominance signal is passed through the condenser 113 and applied to the I demodulator 87 from which the recovered I information passes through the I filter 89 and the I delay line 91 into the matrix and inverter circuits 93. The chrominance signal is also passed through the threshold-level-responsive pass-amplifier 120 which functions according to the amplitude level of the chrominance signal which enters the Q demodulator 151 which in turn delivers a recovered Q signal to the Q filter circuit 153 from whose output circuit the filtered Q signal passes into the matrix and inverter circuits 93.

Consider now in detail the threshold-level-responsive pass-amplifier 120. This circuit 120 is made up of diodes 121 and 123 with their associated resistors and capacitors which form what is essentially a back-to-back clipping circuit which thresholds the amplitude of signals which swing in both negative and positive polarities. After the signals exceed a certain amplitude in either polarity, this amplitude prescribed by the threshold control 141 which is a potentiometer delivering a voltage as supplied by the 300 volt potential terminal 139 in combination with the resistor 137, they are passed in normal manner through the condenser 135 to the Q demodulator 151.

Operation of this threshold-level-responsive pass-amplifier 120 is then as follows. The chrominance signal is adjusted to proper level by means of the potentiometer 110, and fed to the diodes 121 and 123 which are connected back-to-back. The signal return ends of the potentiometers 110 and 112 are by-passed to ground by condenser 115 and returned to point 128 which is the D.-C. center point between points 126 and 130. Points 126 and 130 which correspond to the cathode of diode 129 and the anode of diode 123 respectively, are virtually connected together for the A.-C. signal components by the condenser 125; and the output signal which appears across the resistor 131 which connects the anode of diode 123 to ground, is fed to the Q demodulator 151 by use of the condenser 135. The resistance 143 is an isolating impedance to prevent the positive bias source applied by way of the threshold control 141, from shorting the signal. Thus, point 126 is held at a positive potential with respect to point 128 while point 130 is held at a negative potential with respect to point 128.

Therefore, the cathode of diode 121 is positive with respect to its plate and the plate of diode 123 is negative with respect to its cathode. Input signal levels whose positive and negative excursions do not exceed this bias or threshold value are cut off and not allowed to pass to the Q demodulator 151. When the input signal level exceeds the threshold bias as set by the potentiometer 141 in the positive direction, the diode 121 conducts and when the input signal level exceeds the threshold bias value in the negative direction, the diode 123 conducts. The output signal appears across the resistor 131 and is coupled, as has been mentioned, to terminal 126 by the condenser 125 and fed to the Q demodulator 151 by the condenser 135.

The result is that low level chrominance signals are clipped and the Q demodulator output signal is reduced in level to an extent dependent upon the action of the chrominance signal output circuit 120, resulting in preferred orange-cyan axis operation for low saturation areas. Higher level chrominance (above the threshold bias value determined by the potentiometer 141) signals are passed to the Q demodulator 151 in the normal manner resulting in full three-color operation for objects having a higher degree of saturation.

In practice, the threshold bias value is set up whereby that chrominance signal levels equal to about ½ the reference burst level or lower, which would usually result in two-color operation of flesh tones, hair, background, etc. areas, are not passed. This removes the errors in such objects, which might occur in the green-purple direction that are physically and psychologically more obvious resulting in improved overall color fidelity of the reproduced scene.

The following discussion has related entirely to the applications of the present invention to color television receiver circuitry. It is evident, however, that automatic color saturation level adjustment might also be performed in the color television transmitter.

Figure 10:
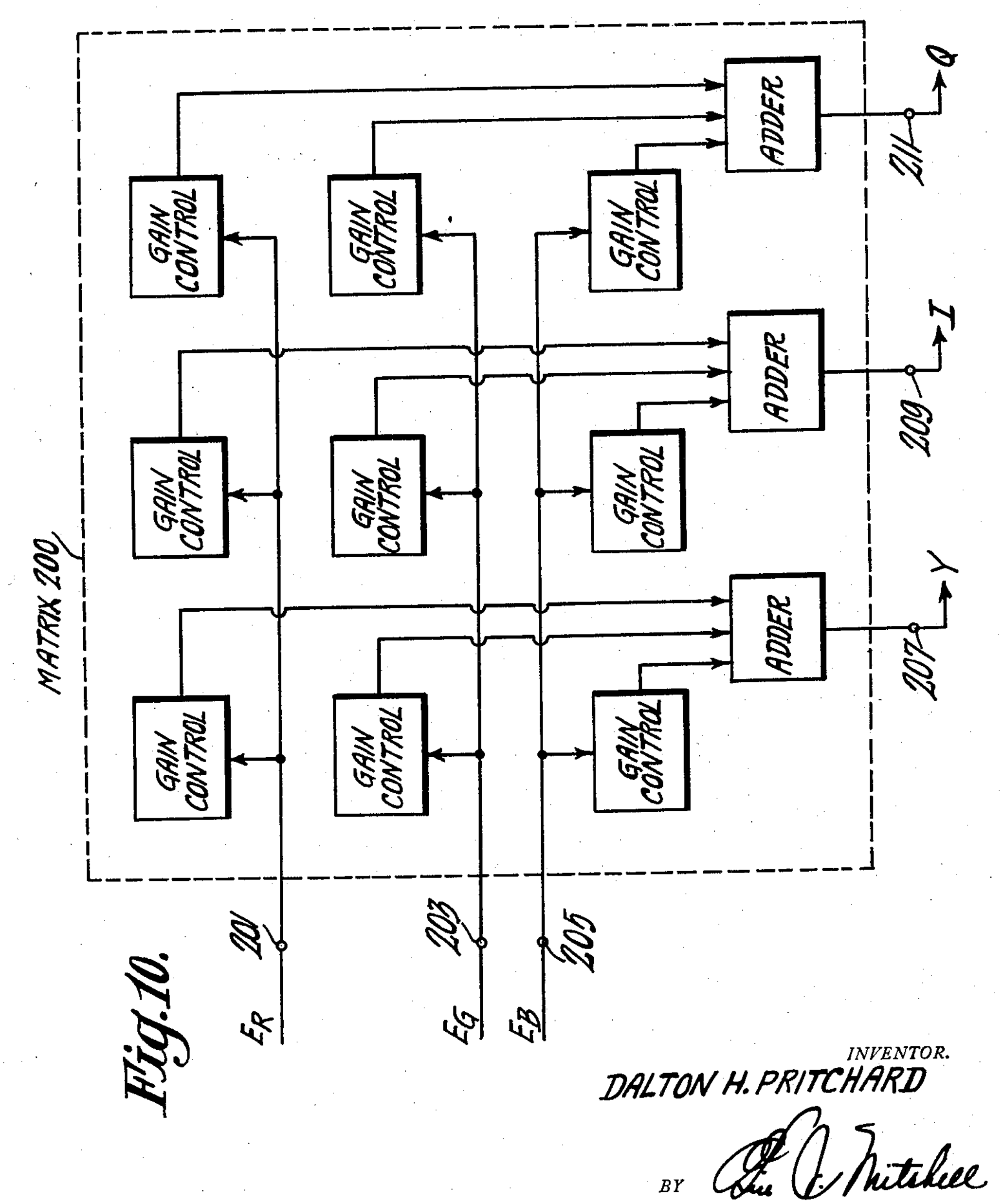
Figure 10 shows a basic matrix circuit for resolving the red, green, and blue signals into Y, I and Q signals.

As has been mentioned, Y, I, and Q signals are formed in the color television transmitted from the red, green, and blue component primary signals which are applied respectively to the input terminals 201, 203, and 205. These Y, I and Q signals may be formed using a matrix circuit similar to that shown in Figure 10, which shows the matrix 200 which employs numerous gain control adjustments and dividers to provide, after suitable adjustment of amplitudes, the Y signal from terminal 207, the I signal from terminal 209, and the Q signal from terminal 211 with their precise relationships with respect to the original primary color signals given by the three relationships $$0.21E_R-0.53E_G+0.31E_B=E_Q \quad (10)$$

$$E_I=0.59E_R-0.28E_G-0.32E_B \quad (11)$$

$$E_Y=0.30E_R+0.59E_G+0.11E_B \quad (12)$$

Consider now an application of the present invention to the color television transmitter circuit in Figure 11 which has performed the function of obtaining Y, I and Q signals from the red, green, and blue signals, and where it is desired that the Q signal information be automatically decreased or cut off should the degree of saturation fall below a prescribed value.

Figure 11:
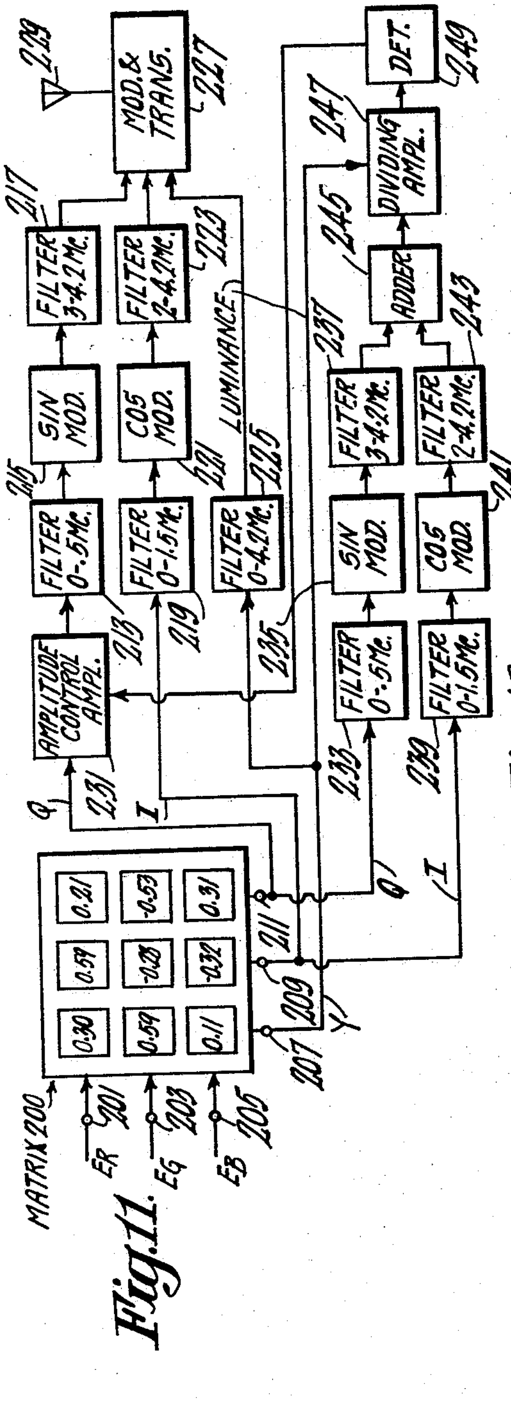
Figure 11 shows one form whereby the present invention may be incorporated into a color television transmitter; in this form of the invention an auxiliary system is provided for producing a separate color subcarrier.

It follows from an inspection of Figure 11 that it may not be convenient to vary the Q signal in accordance with the nature of the modulated color subcarrier at a point before the modulated subcarrier has even been formed. It is, therefore, convenient to provide a separate system for producing a color subcarrier which is modulated by the I and Q signals. Normally the Q signal issues from terminal 211, and, ignoring for a moment the amplitude control amplifier 231 in Figure 11, the Q signal will pass through the filter 213 to the sine modulator 215 where it will be used to modulate the color subcarrier. The output of the sine modulator is then passed through the filter 217 and applied to the modulator and transmitter 227. The I signal passes through the filter 219, and is applied to modulate the color subcarrier in the cosine modulator 221 whose output is then passed through the filter 223 from which circuit it is applied to the modulator and transmitter 227. The luminance signal issuing from terminal 207 passes through the filter network 225 from which circuit it passes to the modulator and transmitter 227. In the modulator and transmitter 227, the I signal modulated subcarrier and the Q signal modulated subcarrier and the luminance signal are combined to perform amplitude of modulation of the transmitter circuit so that when included with the synchronizing signals, a complete modulated color television signal will issue from the antenna 229.

In the circuit shown in Figure 11 the Q signal is also applied to the filter network 233 and is caused to modulate the sine modulator 235 which produces a Q signal modulated subcarrier whose frequency may or may not be that of the color subcarrier used for the transmitter. In like fashion the I signal is passed through the filter network 239 to the cosine demodulator 241 where an I signal modulated subcarrier is formed, the I signal modulated subcarrier having the same subcarrier frequency as that of the sine modulator 235. The I and Q signal modulated subcarriers are then filtered and passed to the adder circuit 245 where a complete modulated subcarrier is formed. Then the output of the adder 245 which contains the chrominance information on a subcarrier is sent to the dividing amplifier which also receives a luminance signal from terminal 207. Because of the dividing action of the dividing amplifier, a color saturation level is established which when applied to the detector 249 yields a reference signal which is proportional to the degree of color saturation. This reference signal is then applied to the amplitude control amplifier 231 which controls the amplitude of the Q signal as it issues forth from the matrix 200.

Figure 12:
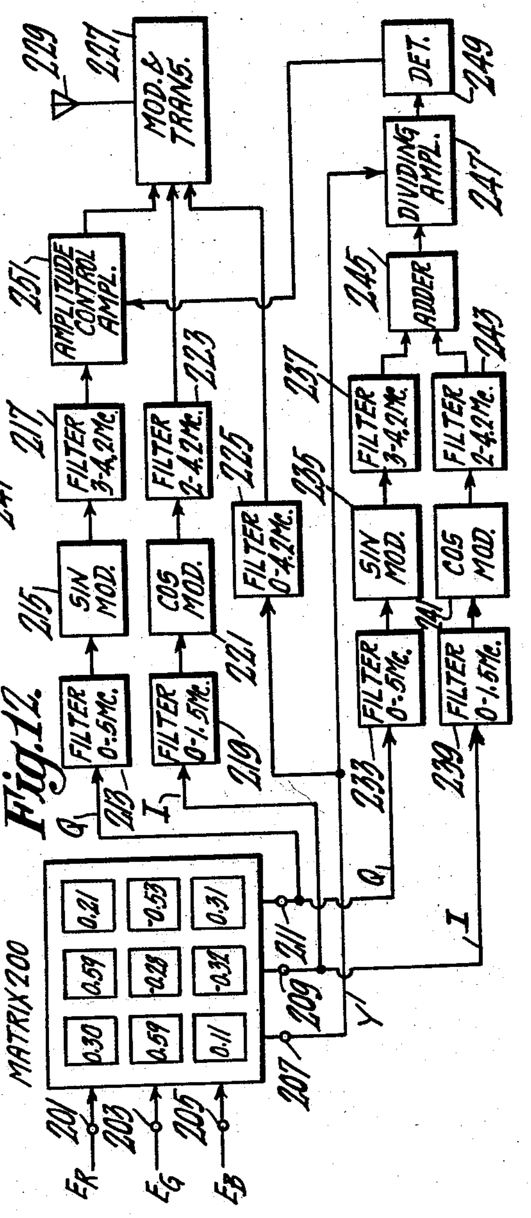
Figure 12 shows a variation of the present invention as described in Figure 11.

Figure 12 shows another variation of the circuit shown in Figure 11 and wherein the amplitude control amplifier 251 is installed in the Q signal modulated subcarrier circuit so that the amplitude of the Q signal modulated subcarrier is rendered subject to the control of the dividing amplifier 247, and the detector 249. Therefore, when the color saturation level falls below a certain value, by proper adjustment of the amplitude control amplifier 251 and the detector 249 the amplitude of the Q signal modulated subcarrier may be either reduced to zero or to some prescribed level, or reduced proportionately with reference to the proportional reduction of the color subcarrier level.

Figure 13:
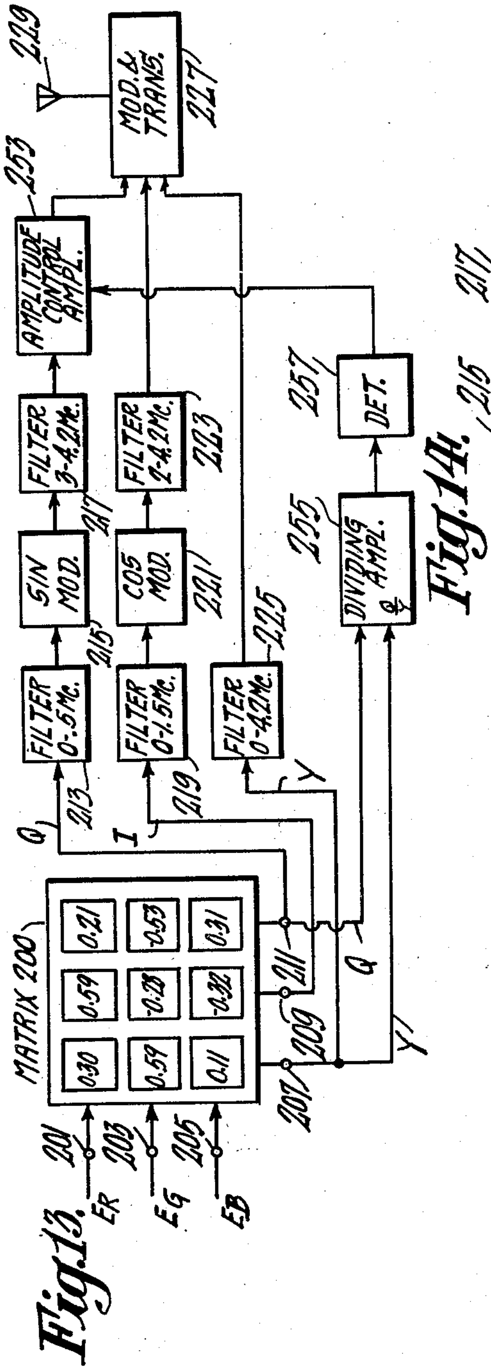
Figure 13 shows the present invention related to a color television transmitter circuit which utilizes the ratio of the Q to the Y signal as an approximate means for determining color saturation level.

Figure 13 shows a means of controlling the color saturation level in a color television transmitter wherein the color saturation level is approximately established. Here the saturation level is approximated by dividing the amplitude of the Q signal by the amplitude of the Y signal in the dividing amplifier 255. The output of the dividing amplifier 255 is passed to the detector 257 which controls the amplitude of the Q signal modulated subcarrier by use of the amplitude control amplifier 253.

Figure 14:
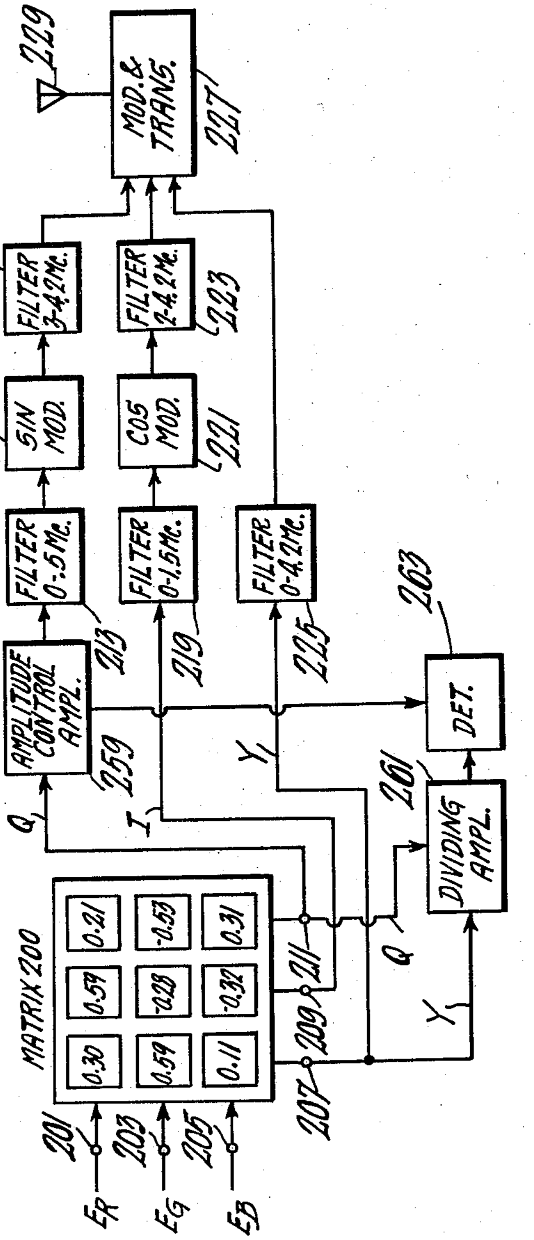
Figure 14 shows another version of the application of the present invention as described in Figure 13.

Figure 14 illustrates a variation of the circuit shown in Figure 13 with the dividing amplifier 261 and the detector 263 being used to control the amplitude of the Q signal as it issues directly from the matrix 200, this control involving the use of the amplitude control amplifier 259.

Figure 15 shows a simplified but highly useful version of the application of the present invention to color television circuitry. Here the Y, I and Q signals are formed utilizing the matrix 200 with the Q, I and Y signals passed through their respective channels. In the channel of the Q signal, however, is installed the threshold-level-responsive pass amplifier 265 which the Q-signal modulated subcarrier must pass before it reaches the main modulator and transmitter 227. The threshold-level-responsive pass amplifier 265 operates such that when the amplitude level of the Q-signal modulated subcarrier is above a predetermined threshold level, the color information passes through. However, when the amplitude level of the Q signal modulated subcarrier falls below this predetermined threshold level the Q signal modulated subcarrier is stopped at this point and does not proceed on to the main modulator and transmitter 227. The actual circuit involved functions in a manner substantially that employed for the threshold-level-responsive pass amplifier 120 in Figure 9.

Figure 16 shows yet another variation of the application of the present invention to color television transmitter circuitry. Here the relative color saturation level is established by a somewhat unique method. The red signal is passed through the red amplifier 279, subjected to the clamp circuit 285 which permits establishment of a level corresponding to that of the weakest signal, passed through the cathode follower circuit 291 and applied to the diode 297. In like fashion the green signal is applied to the diode 299, and the blue signal is applied to the diode 301. By proper establishment of biases for the diodes 297, 299 and 301, only the signal arriving at the three diodes having the largest amplitude will pass through thereby establishing a reference signal which relates the difference in signal level between that of the color having the highest brightness and that of the color or colors having the lowest brightness. This signal, which describes a difference in color brightness levels, is then applied to the dividing amplifier 303. At the same time the red, green, and blue signals are also applied to the luminance signal matrix 277 which is independent of the main matrix 200. In the luminance signal matrix 277 an auxiliary luminance signal Y′ is formed which has a composition of primary colors which is most suitable for use in establishing the color saturation level. For example, the colors may have the brightness level in the Y′ signal at a ratio of 1:1:1 rather than the ratio of .3:.59:.11 as described by Equation 1. The Y′ signal is then impressed on the dividing amplifier 303 whose output is applied to the detector 305 which then applies a control voltage to the amplitude control amplifier 275. This amplitude control amplifier 275 controls the amplitude level of the Q signal as it issues forth from the matrix 200 and is transmitted successively to the filter 213 and the sine modulator 215.

It follows, of course, that the amplitude control amplifier 275 can also be incorporated in the portion of the circuit following the sine modulator 215 thereby subjecting the Q-signal modulated subcarrier to amplitude control to a degree related to the level of color saturation in the particular portion of the color image being scanned.

The preceding specifications have clearly taught a new and valuable improvement in the art of color television transmission and reception. The value of these teachings is far reaching for it is the consumers reconcilement with the recovered television image which is an important factor in determining the overall achievement of fidelity in color image transmission. This overall achievement of fidelity is, of course, also dependent upon the excellence of operation of such circuit parameters as color signal synchronizing circuits and color kinescopes. Improvements in these parameters yield an image of improved detail and color resolution; this is highly desirable but should flesh tones and the like become contaminated with undesirable tints and off-colors, even the finest receiver circuits and color reproducers cannot serve to overcome so detracting an effect.

Having described the invention, what is claimed is:

1. In a color television system for the transmission and reception of a color television signal including a luminance signal, a color subcarrier, said color subcarrier containing a wide-band two-color signal, said wide-band two-color signals prescribed along a two-color axis designed for optimum acuity of the eye, and a narrow band two-color signal, said narrow band two-color signal prescribed along an axis of lesser acuity for the eye, said narrow-band two-color signal axis different from and not necessarily perpendicular to the axis of said wide-band two-color signal, said color television signal characterized by a level of color saturation, said level of color saturation precisely described by the ratio of the amplitude of the color subcarrier to the amplitude of the luminance signal, means for automatic control of the level of said low-acuity narrow-band two-color signal responsive to the level of color saturation comprising in combination, a wide-band two-color signal channel, a narrow-band two-color signal channel, color saturation level detector means, said color saturation level detector means responsive to said color saturation level in said color television signal and adapted to yield a reference voltage proportional to said color saturation level, a narrow band two-color signal channel amplitude control means, said narrow-band two-color signal channel amplitude control means responsive to a control voltage, and means for utilizing said narrow-band two-color signal channel amplitude control means responsive to said reference voltage to control the amplitude of the color signal issuing from said narrow-band two-color signal channel.

2. In a color television system for the transmission and reception of a color television signal including a luminance signal, an orange-cyan signal, said orange-cyan signal prescribed along a two-color axis designed for optimum acuity of the eye, and a green-purple signal, said green-purple signal prescribed along an axis of lesser acuity for the eye, said green-purple signal axis different from and not necessarily perpendicular to the axis of said orange-cyan signal, said color television signal characterized by a level of color saturation, means for automatic control of the level of said low-acuity green-purple signal responsive to the level of color saturation comprising in combination, an orange-cyan signal channel, a green-purple signal channel, color saturation level detector means, said color saturation level detector means responsive to said color saturation level and adapted to yield a reference voltage proportional to said color saturation level, a green-purple signal channel amplitude control means, said green-purple signal channel amplitude control means responsive to a control voltage, means for utilizing said green-purple signal channel amplitude control means responsive to said reference voltage to control the amplitude of the color signal issuing from said green-purple signal channel.

3. In a color television receiver for the reception of a color television signal including a luminance signal, a color subcarrier, said color subcarrier containing color signals having an adjustable gamut of colors, said gamut of colors adjustable toward the gamut of colors for which the eye has maximum acuity, said color television signal characterized by a level of color saturation, means for automatic control of the gamut of colors responsive to the level of color saturation comprising in combination, a first color signal channel, said first color signal channel yielding a gamut of colors for which the eye has greater acuity, a second color signal channel, said second color signal channel yielding a gamut of colors for which the eye has lesser acuity, color saturation level detector means, said color saturation level detector means responsive to said color saturation level and adapted to yield a reference voltage proportional to said color saturation level, a second color signal channel amplitude control means, said second color signal channel amplitude control means responsive to a control voltage, means for utilizing said second color signal channel amplitude control means responsive to said reference voltage for adjusting the combined gamut of colors issuing from both said first and second color signals toward said gamut of colors for which the eye has maximum acuity as a function of level of saturation according to a prescribed relationship.

4. In a color television receiver for receiving a color television signal which includes a luminance signal, an I signal and a Q signal for reconstructing a color image on a color reproducer, means for minimizing Q-signal color error in low color saturation areas of said color image comprising in combination, means for detecting said luminance, I and Q signals, a luminance channel, an I signal channel, a Q signal channel, matrix circuit means, means utilizing said matrix means for combining the signals from said I, Q, and luminance signal channels to produce component color signals for controlling said color reproducer, a color saturation level indicator means for developing a reference signal bearing a prescribed relationship to the level of saturation of areas of said color image, Q signal channel amplitude control means, and means for utilizing said Q signal channel amplitude control means responsive to said reference signal for controlling the signal level through said Q signal channel.

5. In a color television receiver for the reception and reproduction of a color television image signal onto a color reproducer, said color television signal containing a luminance signal and a color subcarrier quadrature modulated by two color signals, one of said color signals being a first color signal and the other a second signal, said first color signal comprising a gamut of colors specified for maximum acuity of the human eye, said second color signal comprising a gamut of colors specified for lesser acuity of the human eye, means for automatically adjusting the combined gamut of colors yielded by both said first and second subcarriers toward said gamut of colors specified for maximum acuity of the human eye in proportion to a color saturation level signal, comprising in combination, means for detection of said luminance signal and said color subcarrier, a first synchronous detector, a first color signal channel means ultizing said first synchronous detector whereby said first color signal is recovered from said color subcarrier and passed through said first color signal channel, a control amplifier, said control amplifier responsive to a control voltage, a second synchronous detector, a second color signal channel, means utilizing said second synchronous detector whereby said second color signal is recovered from said color subcarrier and passed through said second signal channel subject to amplitude level control by said control amplifier, matrix, adder and amplifier means, means for coupling said matrix, adder and amplifier means between said first color signal channel and said second color signal channel and said color reproducer to reproduce said color television image on said color reproducer, color saturation level signal detection means, operatively connecting said color saturation level signal detection means in said color television receiver for developing a reference signal proportional to said color saturation level, means for applying said reference signal to said control amplifier to alter the amplitude level of the second signal issuing from said second color signal channel according to a prescribed relationship when said color saturation level signal decreases below a predetermined value thereby adjusting said combined gamut of colors toward said gamut of colors specified for maximum acuity of the human eye.

6. In a color television receiver adapted for receiving a color television signal including a luminance signal, and a color subcarrier signal, said color subcarrier signal containing an I signal and a Q signal, said I and Q signals to be recovered and combined with the luminance signal to yield a color image on a color reproducer, means for automatically reducing the Q-signal level in low color saturation areas of said color image comprising in combination, means for detecting said luminance, I, and Q signals, a luminance channel, an I signal channel, a Q signal channel, matrix circuit means, means for utilizing said matrix circuit means for combining prescribed portions of the signal from said I, Q, and luminance signal channels to produce selected primary color signals for controlling said color reproducer, a color saturation level detector means operatively connected to derive a reference signal from a comparison of the level of the luminance signal and the level of the color subcarrier signal, a Q-signal channel amplitude control means responsive to said reference signal from said color saturation level detector means, and means for reducing the signal level at the output of said Q signal channel to below a prescribed level when the color saturation level as indicated by said color saturation level indicator means falls below a predetermined value.

7. In a color television receiver adapted for receiving a color television signal which includes a luminance signal, and a color subcarrier signal containing an I signal and a Q signal, said I and Q signals to be recovered and combined with the luminance signal to yield a color image on a color reproducer, means for automatically reducing Q-signal level in low color saturation areas of said color image comprising in combination, means for detecting said luminance, I and Q signals, a luminance channel, an I signal channel, a Q signal channel, matrix circuit means, means for utilizing said matrix circuit means for combining prescribed portions of the signal from said I, Q, and luminance signal channels to produce selected primary color signals for controlling said color reproducer, a relative color saturation level detector means operatively connected in said color television receiver to develop a reference signal from the amplitude level of said chrominance signal, a Q-signal-channel amplitude control means responsive to said reference signal and coupled to said Q-signal-channel for reducing the signal level at the output of said Q-signal channel to below a prescribed level when the relative color saturation level as measured by said relative color saturation level detector falls below a predetermined level.

8. In a color television receiver adapted for receiving a color television signal, said color television signal including a synchronizing signal, a luminance signal, and a color subcarrier signal, said color subcarrier signal containing an I-signal and a Q-signal, the amplitude of said color subcarrier yielding a relative indication of color saturation level, said I and Q signals to be recovered and combined in prescribed proportions with the luminance signal to yield a color image on a color reproducer, means for automatically reducing Q signal amplitude in low color saturation areas comprising in combination, a local color signal source, said local color signal source synchronized by said synchronizing signal and yielding two color signals of different phase, one phase of said local color signals suitable for I-signal demodulation and a second phase suitable for Q-signal demodulation, an I-signal synchronous demodulator, an I-filter and delay channel, means utilizing said local color signal source, I-signal synchronous demodulator and I-filter and delay channel to yield a recovered I-signal, a Q-signal synchronous demodulator, a Q-filter channel, an amplifier amplitude control circuit, said amplifier amplitude control circuit having an input circuit, an output circuit, and a control terminal, a relative saturation level responsive pass circuit, said relative saturation level responsive pass circuit consisting of a bias potential source, a back-to-back clipping circuit, an input circuit and an output circuit, said back-to-back clipping circuit consisting of two diodes connected back-to-back and a resistance-condenser network, means for coupling said back-to-back clipping circuit and said bias potential source between said input circuit and said output circuit whereby signals of amplitude below a prescribed level do not pass through said back-to-back clipping circuit while signals with amplitude above said prescribed level do pass, means for coupling said color subcarrier to the said input circuit of said relative saturation level responsive pass circuit, means for coupling the output circuit of said relative saturation level responsive pass circuit to said Q-signal synchronous detector whereby when the amplitude of said color subcarrier exceeds said prescribed level as predetermined by said bias potential source, said color subcarrier signal passes to said Q-signal synchronous detector.

9. In a color television system for the transmission and reproduction of a color television image signal onto a color image reproducer, said color television signal containing a luminance signal and a color subcarrier quadrature modulated by two color signals, one of said color signals being a high acuity color signal and the other a low acuity color signal, said high acuity color signal prescribed along a gamut of colors specified for high acuity of the eye, said low acuity color signal prescribed along a gamut of colors specified for lesser acuity of the eye, means for automatically changing the level of said low acuity color signal in proportion to the amplitude level of said color subcarrier, comprising in combination, means for detection of said luminance signal and said color subcarrier, a first synchronous detector, a high acuity color channel signal, means utilizing said first synchronous detector whereby said high acuity color signal is recovered from said color subcarrier and passed through said high acuity color signal channel, a control amplifier, said control amplifier responsive to a control voltage, a second synchronous detector, a low acuity color signal channel, means utilizing said control amplifier and said second synchronous detector in said low acuity color signal channel whereby said low acuity color signal is subject to amplitude level control by said control amplifier, matrix, adder and amplifier means, means for coupling said matrix, adder and amplifier means between said high acuity color signal and said low acuity color signal channel and said color image reproducer to reproduce said color television image onto said color image reproducer, color subcarrier amplitude detection means, said color subcarrier amplitude detection means responsive to said color subcarrier and yielding a reference signal proportional to the amplitude of said color subcarrier, means for coupling said color subcarrier amplitude detection means to said control amplifier whereby the amplitude level of the low acuity signal issuing from said low acuity color signal channel is reduced according to a prescribed relationship when the level of color saturation decreases.

10. In a color television receiver adapted for receiving a color television signal including a synchronizing signal, a luminance signal, and a color subcarrier signal, said color subcarrier signal containing an I-signal and a Q signal, the amplitude of said color subcarrier yielding a relative indication of color saturation level, said I and Q signals to be recovered and combined in prescribed proportions with the luminance signal to yield a color image on a color kinescope, means for automatically reducing Q-signal amplitude in low color saturation areas comprising in combination, a local color signal source, said local color signal source synchronized by said synchronizing signal and yielding two color signals of different phase, one phase of said local color signals suitable for I-signal demodulation and a second phase suitable for Q-signal demodulation, an I-signal synchronous demodulator, an I-filter and delay channel, means utilizing said local color signal source, I-signal synchronous demodulator and I-filter and delay channel to yield a recovered I-signal, a Q-signal synchronous demodulator, a Q-filter channel, an amplifier amplitude control circuit, said amplifier amplitude control circuit having an input circuit, an output circuit, and a control terminal, a relative saturation level detector, said relative saturation level detector responsive to the amplitude of said color subcarrier to yield a reference signal proportional to the amplitude of said subcarrier, means for coupling said color subcarrier to said Q-signal synchronous detector, means for coupling said color signal of suitable phase to said Q-signal synchronous detector to provide recovery of said Q-signal, means for coupling said recovered Q-signal through said amplifier amplitude control circuit to said Q-filter channel to provide a filtered Q-signal, means for coupling said reference signal from said relative saturation level detector to the control terminal of said amplifier amplitude control circuit whereby the amplitude of the Q-signal issuing from said Q-signal synchronous detector decreases as the relative color saturation level decreases according to a prescribed relationship, inverter, matrix and amplifier means, said inverter, matrix and amplifier means having an input circuit and an output circuit, means for coupling said luminance signal, said recovered I-signal and said relative saturation level controlled Q-signal to the input circuit of said inverter, matrix and amplifier means to produce primary color signals in the output circuit, means for coupling the output circuit of said inverter, matrix, and amplifier means to said color kinescope to provide a color image.

11. In a color television receiver adapted for receiving a color television signal including a synchronizing signal, a luminance signal, and a color subcarrier signal, said color subcarrier signal containing an I-signal and a Q-signal, the amplitude of said color subcarrier yielding a relative indication of color saturation level, said I and Q signals to be recovered and combined in prescribed proportions with the luminance signal to yield a color image on a color kinescope, means for automatically reducing Q signal amplitude in low color saturation areas comprising in combination, a local color signal source, said local color signal source synchronized by said synchronizing signal and yielding two color signals of different phase, one phase of said local color signals suitable for I-signal demodulation and a second phase suitable for Q-signal demodulation, an I-signal synchronous demodulator, an I-filter and delay channel, means utilizing said local color signal source, I-signal synchronous demodulator and I-filter and delay channel to yield a recovered I-signal, a Q-signal synchronous demodulator, a Q-filter channel, an amplifier amplitude control circuit, said amplifier amplitude control circuit having an input circuit, an output circuit, and a control terminal, a relative saturation level detector, said relative saturation level detector responsive to the amplitude of said color subcarrier to yield a reference signal proportional to the amplitude of said subcarrier, means for coupling said color subcarrier to said Q-signal synchronous detector, means for coupling said color signal of suitable phase to said Q-signal synchronous detector to provide for recovery of said Q-signal, means for passing said recovered Q-signal through said Q-signal filter channel to the input circuit of said amplifier amplitude control circuit, means for coupling the reference signal from said relative saturation level detector to the control terminal of said amplifier amplitude control circuit whereby the amplitude of the Q signal appearing at the output circuit of said amplifier amplitude control circuit decreases as the relative saturation level decreases according to a prescribed relationship, inverter, matrix and amplifier means, said inverter, matrix and amplifier means having an input circuit and an output circuit, means for coupling said luminance signal, said recovered I-signal and said relative saturation level controlled Q-signal to the input circuit of said inverter, matrix and amplifier means to produce primary color signals in the output circuit, and means for coupling the output circuit of said inverter, matrix, and amplifier means to said color kinescope to provide a color image.

12. In a color television receiver adapted for receiving a color television signal including a synchronizing signal, a luminance signal, and a color subcarrier signal, said color subcarrier signal containing an I-signal and a Q-signal, the amplitude of said color subcarrier yielding a relative indication of color saturation level, said I and Q signals to be recovered and combined in prescribed proportions with the luminance signal to yield a color image on a color kinescope, means for automatically reducing Q-signal amplitude in low color saturation areas comprising in combination, a local color signal source, said local color signal source synchronized by said synchronizing signal and yielding two color signals of differential phase, one phase of said local color signals suitable for I-signal demodulation and a second phase suitable for Q-signal demodulation, an I-signal synchronous demodulator, an I-filter and delay channel, means utilizing said local color signal source, I-signal synchronous demodulator and I-filter and delay channel to yield a recovered I-signal, a Q-signal synchronous demodulator, a Q-filter channel, a relative saturation level responsive pass circuit, said relative saturation level responsive pass circuit consisting of a bias potential source, a back-to-back clipping circuit, an input circuit and an output circuit, said back-to-back clipping circuit consisting of two diodes connected back-to-back and a resistance-condenser network, means for coupling said back-to-back clipping circuit and said bias potential source between said input circuit and said output circuit whereby signals of amplitude below a prescribed level do not pass through said back-to-back clipping circuit while signals with amplitude above said prescribed level do pass, means for coupling said color subcarrier to said input circuit of said relative saturation level responsive pass circuit, means for coupling the output circuit of said relative saturation level responsive pass circuit to said Q-signal synchronous detector whereby when the amplitude of said color subcarrier rises above said prescribed level as predetermined by said bias potential source, said color subcarrier signal passes to said Q-signal synchronous detector, means for coupling said local color signal of suitable phase to said Q-signal synchronous detector, means for coupling output of said Q-signal synchronous detector through said Q-filter channel to yield a recovered Q-signal, inverter, matrix and amplifier means, said inverter, matrix and amplifier means having an input circuit and an output circuit, means for coupling said luminance signal, said recovered I-signal and said recovered Q-signal to the input circuit of said inverter, matrix and amplifier, means to produce primary color signals in the output circuit, and means for coupling the output circuit of said inverter, matrix, and amplifier means to said color kinescope to provide a color image.

13. In a color television receiver adapted for receiving a color television signal including a synchronizing signal, a luminance signal, and a color subcarrier signal, said color subcarrier signal containing an orange-cyan axis signal and a green-purple axis signal, the ratio of the amplitude of said color subcarrier to the amplitude of the luminance signal yielding an accurate representation of color saturation level, said orange-cyan and green-purple axis signals to be recovered and combined in prescribed proportions with the luminance signal to yield a color image on a color image reproducer, means for automatically controlling the amplitude of green-purple axis signal according to a prescribed relationship in low color saturation areas comprising in combination, a local color signal source, said local color signal source synchronized by said synchronizing signal and yielding two color signals of different phase, one phase of said local color signals suitable for orange-cyan axis signal demodulation and a second phase suitable for green-purple axis signal demodulation, an orange-cyan axis signal synchronous demodulator, on orange-cyan axis signal filter and delay channel, means utilizing said local color signal source, orange-cyan axis signal synchronous demodulator and orange-cyan axis signal filter and delay channel to yield a recovered orange-cyan axis signal, a green-purple axis signal channel, said green-purple axis signal channel including a green-purple axis signal synchronous demodulator, a green-purple axis filter channel, an amplifier amplitude control circuit, said amplifier amplitude control circuit having an input circuit, an output circuit, and a control terminal, a saturation level detector, said saturation level detector responsive to the ratio of the amplitude of said color subcarrier signal to the amplitude of said luminance signal to yield a reference signal proportional to the amplitude of said ratio, means for coupling said color subcarrier to said green-purple axis signal channel, means for including said amplifier amplitude control circuit in said green-purple axis signal channel, means for coupling said local color signal of suitable phase to said green-purple axis signal synchronous detector, means for coupling said color saturation level detector to the control terminal of said amplifier amplitude control circuit whereby the amplitude of the recovered green-purple axis signal decreases as the color saturation level decreases according to a prescribed relationship, inverter, matrix and amplifier means, said inverter, matrix and amplifier means having an input circuit and an output circuit, means for coupling said luminance signal, said recovered orange-cyan axis signal and said saturation level controlled green-purple axis signal to the input circuit of said inverter, matrix and amplifier means to produce component color signals in the output circuit, and means for coupling the output circuit of said inverter, matrix, and amplifier means to said color image reproducer to provide a color image.

14. In a color television receiver adapted for receiving a color television signal, said color television signal including a synchronizing signal, a luminance signal, and a color subcarrier signal, said color subcarrier signal containing an I-signal and a Q-signal, the ratio of the amplitude of said color subcarrier to the amplitude of the luminance signal yielding an accurate representation of color saturation level, said I and Q signals to be recovered and combined in prescribed proportions with the luminance signal to yield a color image on a color kinescope, means for automatically reducing Q-signal amplitude in low color saturation areas comprising in combination, a local color signal source, said local color signal source synchronized by said synchronizing signal and yielding two color signals of different phase, one phase of said local color signals suitable for I-signal demodulation and a second phase suitable for Q-signal demodulation, an I-signal synchronous demodulator, an I-filter and delay channel, means utilizing said local color signal source, I-signal synchronous demodulator and I-filter and delay channel to yield a recovered I-signal, a Q-signal synchronous demodulator, a Q-filter channel, an amplifier amplitude control circuit, said amplifier amplitude control circuit having an input circuit, an output circuit, and a control terminal, a saturation level detector, said saturation level detector responsive to the ratio of the amplitude of said color subcarrier signal to the amplitude of said luminance signal to yield a reference signal proportional to the amplitude of said ratio, means for coupling said color subcarrier to said Q-signal synchronous detector, means for coupling said color signal of suitable phase to said Q-signal synchronous detector to provide recovery of said Q-signal, means for coupling said recovered Q-signal through said amplifier amplitude control circuit to said Q-filter channel to provide a filtered Q-signal, means for coupling said color saturation level detector to the control terminal of said amplifier amplitude control circuit whereby the amplitude of the Q-signal issuing from said Q-signal synchronous detector decreases as the color saturation level decreases according to a prescribed relationship, inverter, matrix, and amplifier means, said inverter, matrix and amplifier means having an input circuit and an output circuit, means for coupling said luminance signal, said recovered I-signal and said saturation level controlled Q-signal to the input circuit of said inverter, matrix and amplifier means to produce primary color signals in the output circuit, and means for coupling the output circuit of said inverter, matrix, and amplifier means to said color kinescope to provide a color image.

15. In a color television receiver adapted for receiving a color television signal including a synchronizing signal, a luminance signal, and a color subcarrier signal, said color subcarrier signal containing an I-signal and a Q-signal, the ratio of the amplitude of said color subcarrier to the amplitude of the luminance signal yielding an accurate representation of color saturation level, said I and Q signals to be recovered and combined in prescribed proportions with the luminance signal to yield a color image on a color kinescope, means for automatically reducing Q-signal amplitude in low color saturation areas comprising in combination, a local color signal source, said local color signal source synchronized by said synchronizing signal and yielding two color signals of different phase, one phase of said local color signals suitable for I-signal demodulation and a second phase suitable for Q-signal demodulation, an I-signal synchronous demodulator, an I-filter and delay channel, means utilizing said local color signal source, I-signal synchronous demodulator and I-filter and delay channel to yield a recovered I-signal, a Q-signal synchronous demodulator, a Q-filter channel, an amplifier amplitude control circuit, said amplifier amplitude control circuit having an input circuit, an output circuit, and a control terminal, a saturation level detector, said saturation level detector responsive to the ratio of the amplitude of said color subcarrier signal to the amplitude of said luminance signal to yield a reference signal proportional to the amplitude of said ratio, means for coupling said color subcarrier to said Q-signal synchronous detector, means for coupling said color signal of suitable phase to said Q-signal synchronous detector to provide for recovery of said Q-signal, means for passing said recovered Q-signal through said Q-signal filter channel to the input circuit of said amplifier amplitude control circuit, means for coupling said reference signal to the control terminal of said amplifier amplitude control circuit to cause the amplitude of the Q-signal appearing at the output circuit of said amplifier amplitude control circuit to decrease as the saturation level decreases according to a prescribed relationship, inverter, matrix and amplifier means, said inverter, matrix and amplifier means having an input circuit and an output circuit, means for coupling said luminance signal, said recovered I-signal and said relative saturation level controlled Q-signal to the input circuit of said inverter, matrix and amplifier means to produce primary color signals in the output circuit, and means for coupling the output circuit of said inverter, matrix, and amplifier means to said color kinescope to provide a color image.

16. In a color television receiver adapted for receiving a color television signal including a synchronizing signal, a luminance signal, and a color subcarrier signal, said color subcarrier signal containing an I-signal and a Q-signal, the ratio of the amplitude of said color subcarrier to the amplitude of the luminance signal yielding an accurate representation of color saturation level, said I and Q signals to be recovered and combined in prescribed proportions with the luminance signal to yield a color image on a color kinescope, means for automatically reducing Q-signal amplitude in low color saturation areas comprising in combination, a local color signal source, said local color signal source synchronized by said synchronizing signal and yielding two color signals of different phase, one phase of said local color signals suitable for I-signal demodulation and a second phase suitable for Q-signal demodulation, an I-signal synchronous demodulator, an I-filter and delay channel, means utilizing said local color signal source, I-signal synchronous demodulator and I-filter and delay channel to yield a recovered I-signal, a Q-signal synchronous demodulator, a Q-filter channel, an amplifier amplitude control circuit, said amplifier amplitude control circuit having an input circuit, an output circuit, and a control terminal, a saturation level detector, said saturation level detector consisting of a dividing amplifier coupled to an amplitude detector, means coupling said color subcarrier signal and said luminance signal to said dividing amplifier whereby said amplitude detector yields a reference voltage proportional to the division of the amplitude of said color subcarrier signal by the amplitude of said luminance signal, means for coupling said color subcarrier through said amplifier amplitude control circuit to said Q-signal synchronous detector, means for coupling said local color signal of suitable phase to said Q-signal synchronous detector, means for coupling output of said Q-signal synchronous detector through said Q-filter channel to yield a recovered Q-signal, means for coupling said reference voltage to the control terminal of said amplifier amplitude control circuit whereby the amplitude of the color subcarrier signal as impressed on said Q-signal synchronous detector and thereby the recovered Q-signal decreases as the relative color saturation level decreases according to a prescribed relationship, inverter, matrix and amplifier means, said inverter, matrix and amplifier means having an input circuit and an output circuit, means for coupling said luminance signal, said recovered I-signal and said saturation level controlled Q-signal to the input circuit of said inverter, matrix and amplifier means to produce primary color signals in the output circuit, and means for coupling the output circuit of said inverter, matrix, and amplifier means to said color kinescope to provide a color image.

17. In a color television receiver adapted for receiving a color television signal including a synchronizing signal, a luminance signal, and a color subcarrier signal, said color subcarrier signal containing a first color signal and a second color signal, said first color signal having a gamut of colors designed for maximum acuity of the eye, said second color signal having a gamut of colors designed for lesser acuity of the eye, the ratio of the amplitude of said color subcarrier to the amplitude of the luminance signal yielding an accurate representation of color saturation level, said first and second color signals to be recovered and combined in prescribed proportions with the luminance signal to yield a color image on a color image reproducer, means for automatically reducing second color signal amplitude in low color saturation areas comprising in combination, a local color signal source, said local color signal source synchronized by said synchronizing signal and yielding two color signals of different phase, one phase of said local color signals suitable for first color signal demodulation and a second phase suitable for second color signal demodulation, a first color signal synchronous demodulator, a first color filter and delay channel, means utilizing said local color signal source, first color signal synchronous demodulator and first color filter and delay channel to yield a recovered first color signal, a second color signal channel, said second color signal channel including a second color signal synchronous demodulator, a second color signal filter channel, and an amplifier amplitude control circuit, said amplifier amplitude control circuit having an input circuit, an output circuit, and a control terminal, a saturation level detector, said saturation level detector consisting of a dividing amplifier coupled to an amplitude detector, means coupling said color subcarrier signal and said luminance signal to said dividing amplifier whereby said amplitude detector yields a reference voltage proportional to the division of the amplitude of said color subcarrier signal by the amplitude of said luminance signal, means for coupling said color subcarrier to said second color signal channel, means for coupling said color signal of suitable phase to said second color signal synchronous detector to provide for recovery of said second color signal, means for coupling said reference voltage to the control terminal of said amplifier amplitude control circuit whereby the amplitude of the second color signal appearing at the output circuit of said amplifier amplitude control circuit decreases as the saturation level decreases according to a prescribed relationship, inverter, matrix and amplifier means, said inverter, matrix and amplifier means having an input circuit and an output circuit, means for coupling said luminance signal, said recovered first color signal and said saturation level controlled second color signal to the input circuit of said inverter, matrix and amplifier means to produce component color signals in the output circuit, and means for coupling the output circuit of said inverter, matrix, and amplifier means to said color image reproducer to provide a color image.

18. In a color television receiver adapted for receiving a color television signal including a synchronizing signal, a luminance signal, and a color subcarrier signal, said color subcarrier signal containing an I-signal and a Q-signal, the ratio of the amplitude of said color subcarrier to the amplitude of the luminance signal yielding an accurate representation of color saturation level, said I and Q signals to be recovered and combined in prescribed proportions with the luminance signal to yield a color image on a color kinescope, means for automatically reducing Q-signal amplitude in low color saturation areas comprising in combination, a local color signal source, said local color signal source synchronized by said synchronizing signal and yielding two color signals of different phase, one phase of said local color signals suitable for I-signal demodulation and a second phase suitable for Q-signal demodulation, an I-signal synchronous demodulator, an I-filter and delay channel, means utilizing said local color signal source, I-signal synchronous demodulator and I-filter and delay channel to yield a recovered I-signal, a Q-signal synchronous demodulator, a Q-filter channel, an amplifier amplitude control circuit, said amplifier amplitude control circuit having an input circuit, an output circuit, and a control terminal, a saturation level detector, said saturation level detector consisting of an amplifier tube, said amplifier tube having a cathode, a control grid, at least a second grid and a third grid, and an anode, an anode resistor, a potential source having a high potential terminal and a low potential terminal, a fixed potential terminal, means for connecting said low potential terminal of said potential source to said fixed potential terminal, means for connecting said anode resistor between the anode of said amplifier tube and the high potential terminal of said potential source, means for connecting said cathode resistor between the cathode of said amplifier tube and said fixed potential terminal, means for coupling said color subcarrier signal to the control grid of said amplifier tube, means for connecting said luminance signal to the second grid of said amplifier tube, biasing and potential means applied to said amplifier tube whereby said amplifier tube yields the quotient of the amplitude of the color subcarrier signal and the amplitude of the luminance signal, a rectifier, a filter network, said filter network having a bandwidth substantially that of said Q-signal, means for coupling said rectifier and said filter network between the anode of said amplifier tube and said fixed potential terminal to yield a reference signal across said filter network which is proportional to said quotient, means for coupling said color subcarrier through said amplifier amplitude control circuit to said Q-signal synchronous detector, means for coupling said local color signal of suitable phase to said Q-signal synchronous detector, means for coupling output of said Q-signal synchronous detector through said Q-filter channel to yield a recovered Q-signal, means for coupling said reference signal to the control terminal of said amplifier amplitude control circuit whereby the amplitude of the color subcarrier signal as impressed on said Q-signal synchronous detector and thereby the recovered Q-signal decreases as the color saturation level decreases according to a prescribed relationship, inverter, matrix and amplifier means, said inverter, matrix and amplifier means having an input circuit and an output circuit, means for coupling said luminance signal, said recovered I-signal and said saturation level controlled Q-signal to the input circuit of said inverter, matrix and amplifier means to produce primary color signals in the output circuit, and means for coupling the output circuit of said inverter, matrix, and amplifier means to said color kinescope to provide a color image.

19. The claim as set forth in claim 17 and wherein when said quotient decreases to below a predetermined value, said Q-signal level will be reduced substantially to zero.

20. In a color television receiver adapted for receiving a color television signal including a synchronizing signal, a luminance signal, and a color subcarrier signal, said color subcarrier signal containing an I-signal and a Q-signal, the ratio of the amplitude of said color subcarrier to the amplitude of the luminance signal yielding an accurate representation of color saturation level, said I and Q signals to be recovered and combined in prescribed proportions with the luminance signal to yield a color image on a color kinescope, means for automatically reducing Q-signal amplitude in low color saturation areas comprising in combination, a local color signal source, said local color signal source synchronized by said synchronizing signal and yielding two color signals of different phase, one phase of said local color signals suitable for I-signal demodulation and a second phase suitable for Q-signal demodulation, an I-signal synchronous demodulator, an I-filter and delay channel, means utilizing said local color signal source, I-signal synchronous demodulator and I-filter and delay channel to yield a recovered I-signal, a Q-signal synchronous demodulator, a Q-filter channel, an amplifier amplitude control circuit, said amplifier amplitude control circuit having an input circuit, an output circuit, and a control terminal, a saturation level detector, said saturation level detector consisting of an amplifier tube, said amplifier tube having a cathode, a control grid, at least a second grid and a third grid, and an anode, an anode resistor, a potential source, said potential source having a high potential terminal and a low potential terminal, a fixed potential terminal, means for connecting said low potential terminal of said potential source to said fixed potential terminal, means for connecting said anode resistor between the anode of said amplifier tube and the high potential terminal of said potential source, means for connecting said cathode resistor between the cathode of said amplifier tube and said fixed potential terminal, means for coupling said color subcarrier signal to the control grid of said amplifier tube, means for connecting said luminance signal to the second grid of said amplifier tube, biasing and potential means applied to said amplifier tube whereby said amplifier tube yields the quotient of the amplitude of the color subcarrier signal and the amplitude of the luminance signal, a rectifier, a filter network, said filter network having a bandwidth substantially that of said Q-signal, means for coupling said rectifier and said filter network between the anode of said amplifier tube and said fixed potential terminal to yield a reference signal across said filter network which is proportional to said quotient, means for coupling said color subcarrier to said Q-signal synchronous detector, means for coupling said color signal of suitable phase to said Q-signal synchronous detector to provide for recovery of said Q signal, means for passing said recovered Q signal through said Q-signal filter channel to the input circuit of said amplifier amplitude control circuit, means for coupling said reference signal to the control terminal of said amplifier amplitude control circuit whereby the amplitude of the Q signal appearing at the output circuit of said amplifier amplitude control circuit decreases as the relative saturation level decreases according to a prescribed relationship, inverter, matrix and amplifier means, said inverter, matrix and amplifier means having an input circuit and an output circuit, means for coupling said luminance signal, said recovered I-signal and said relative saturation level controlled Q-signal to the input circuit of said inverter, matrix and amplifier means to produce primary color signals in the output circuit, and means for coupling the output circuit of said inverter, matrix, and amplifier means to said color kinescope to provide a color image.

21. In a color television system for the transmission and reception of a color television signal to form a three primary color image, said color television signal including a luminance signal, a wide band two-color signal, said wide band two-color signal prescribed along a two-color axis designed for optimum acuity of the eye, and a narrow band two-color signal, said narrow band two-color signal prescribed along an axis of lesser acuity for the eye; said narrow band two-color signal axis different from and not necessarily perpendicular to the axis of said wide band two-color signal, said color television signal characterized by a measurable level of color saturation substantially described by the division of the amplitude of said narrow-band two-color signal to the amplitude of said luminance signal, means for automatic control of the level of said low-acuity narrow band two-color signal responsive to the level of color saturation comprising in combination, a wide band two-color signal channel, a narrow band two-color signal channel, color saturation level detector means responsive to said color saturation level and adapted to yield a reference voltage proportional to said color saturation level, a narrow band two-color signal channel amplitude control means responsive to said reference voltage for controlling the amplitude of the color signal issuing from said narrow band two-color signal channel according to a prescribed relationship with respect to the level of saturation.

22. In a color television system for the transmission and reception of a color television signal to form a three primary color image, said color television signal including a luminance signal, a wide-band two-color signal, said wide band two color signal prescribed along a two-color axis designed for optimum acuity of the eye, and a narrow band two-color signal, said narrow band two-color signal prescribed along an axis of lesser acuity for the eye; said narrow band two-color signal axis different from and not necessarily perpendicular to the axis of said wide band two-color signal, said color television signal characterized by a measurable level of color saturation, said level of color saturation suitably described by the division of the relative difference in amplitude level between the highest level primary color and the lowest level primary color and a luminance signal made up of prescribed ratios of the brightness of the individual primary colors; means for automatic control of the level of said low-acuity narrow band two-color signal responsive to the level of color saturation comprising in combination, a wide band two-color signal channel, a narrow band two-color signal channel, color saturation level detector means, said color saturation level detector means responsive to said color saturation level and adapted to yield a reference voltage proportional to said color saturation level, a narrow band two-color signal channel amplitude control means responsive to said reference voltage and operatively connected to said narrow band two-color signal channel for controlling the amplitude of the color signal issuing from said narrow band two-color signal channel.

23. In a color television receiver for receiving a color television signal which includes a luminance signal, a Q-signal modulated subcarrier and an I-signal modulated subcarrier for yielding proper signal components for the reconstruction of a color image on a color kinescope, means for stopping said Q-signal modulated subcarrier when its amplitude level decreased below a prescribed level, comprising in combination, means for detecting said luminance, I, and Q signals, a luminance channel, an I-signal modulated subcarrier channel, a Q-signal modulated subcarrier channel, I detection and circuit means, Q detection and circuit means, matrix circuit means, means for utilizing said matrix means for obtaining from said I and Q detection and circuit means prescribed portions of I and Q signals which when combined with suitable portions of luminance signals produce selected primary color signal for controlling said color kinescope, a Q-signal modulated subcarrier channel amplitude control means responsive to the amplitude level of said Q-signal modulated subcarrier for stopping said Q-signal from reaching said matrix means when the amplitude of said Q-signal modulated subcarrier falls below a threshold level.

24. In a color television transmitter for the formation and transmission of a color television signal containing a luminance signal and a color subcarrier modulated by two color signals, one of said color signals being a first color signal and the other a second signal, said first color signal a prescribed two-color line axis signal specified for maximum acuity of the human eye, said second color signal a two color-line axis signal along an axis different from but not necessarily perpendicular to the axis of said first color signal, means for automatically changing the level of said second color signal according to a prescribed relationship with respect to the level of said color subcarrier comprising in combination, means for formation of said luminance signal, means for generating said color subcarrier, a first modulator, a first color signal channel, means utilizing said first modulator whereby said first color signal is caused to modulate said color subcarrier, means whereby the resultant modulated color subcarrier is passed through said first color signal channel, a control amplifier, said control amplifier responsive to a control voltage, a second modulator, a second color signal channel, means utilizing said second modulator whereby said second color signal is caused to modulate said color subcarrier, means whereby the resultant modulated color subcarrier is subject to amplitude level control by said control amplifier, transmitter means, means for adding said color subcarriers and for causing said combined modulated subcarrier to modulate the output of said transmitter means, a color saturation level detector, said color saturation level detector responsive to the division of the amplitude of said combined modulated color subcarriers and the amplitude of said luminance signal thereby furnishing a reference signal proportional to the magnitude of said division, means for utilizing said reference signal to control said control amplifier in accordance with said prescribed relationship.

25. The invention as set forth in claim 24 and wherein said control amplifier reduces the signal level in said narrow band color signal channel to substantially zero when the color saturation level falls below a predetermined value.

26. In a color television transmitter including means for resolving the television image to be transmitted into three primary color signals, matrix means utilized for combining said three primary color signals in prescribed amount to form a luminance signal, an I-signal, and a Q-signal, subcarrier means including means for causing a subcarrier to be modulated by both said I-signals and said Q-signals to develop a Q-signal modulated subcarrier and an I-signal modulated subcarrier, Q-filter means, means for utilizing said Q-filter means to filter said Q-signal modulated subcarrier, I-filter means, means for utilizing said I-filter means for filtering said I-signal modulated subcarrier, means for combining said filtered I-signal modulated subcarrier and said filtered Q-signal modulated subcarrier to form a combined modulated subcarrier, transmitter means, means for modulating transmitter means utilizing said combined modulated subcarrier and said luminance signal, said television image characterized by a color-saturation level, said color saturation level suitably approximated by the division of the amplitude of said Q-signal and the amplitude of said luminance signal, means for automatically controlling the level of the Q-signal as a function of the color saturation level comprising in combination, an amplitude control amplifier, said amplitude control amplifier responsive to a control voltage, a dividing amplifier and detector, said dividing amplifier and detector coupled to said matrix to yield a reference signal proportional to the division of the amplitude of said Q-signal by the amplitude of said luminance signal, means for utilizing said amplitude control amplifier to control the amplitude of said Q-signal prior to inclusion into said subcarrier means, means utilizing the reference signal supplied by said dividing amplifier and detector to control said amplitude control amplifier whereby the amplitude of said Q-signal reaching said subcarrier means is caused to vary in proportion to the level of color saturation according to a prescribed relationship.

27. In a color television transmitter including means for resolving the television image to be transmitted into three primary color signals, the combination of, matrix means utilized for combining said three primary color signals in prescribed amount to form a luminance signal, an I-signal, and a Q-signal, subcarrier modulation means for causing subcarrier signals to be modulated by both said I-signals and said Q-signals, to develop a Q-signal modulated subcarrier and an I-signal modulated subcarrier, Q-filter means, means for utilizing said Q-filter means to filter said Q-signal modulated subcarrier, I-filter means, means for utilizing said I-filter means for filtering said I-signal modulated subcarrier, means for combining said filtered I-signal modulated subcarrier and said filtered Q-signal modulated subcarrier to form a combined modulated subcarrier, transmitter means, means for modulating transmitter means utilizing said combined modulated subcarrier and said luminance signal, an amplitude control amplifier responsive to a control voltage, a dividing amplifier and detector coupled to said matrix to develop a reference signal proportional to the division of the amplitude of said Q-signal by the amplitude of said luminance signal, means for utilizing said amplitude control amplifier to control the amplitude of said Q-signal modulated subcarrier utilizing said reference signal to control the gain of said amplitude control amplifier.

28. In a color television transmitter including means for resolving the television image to be transmitted into three primary color signals, the combination of, matrix means utilized for combining said three primary color signals in prescribed amount to form a luminance signal, an I-signal, and a Q-signal, subcarrier modulation means for causing subcarrier signals to be modulated by both said I-signals and said Q-signals to develop a Q-signal modulated subcarrier and an I-signal modulated subcarrier, Q-filter means, means for utilizing said Q-filter means to filter said Q-signal modulated subcarrier, I-filter means, means for utilizing said I-filter means for filtering said I-signal modulated subcarrier, means for combining said filtered I-signal modulated subcarrier and said filtered Q-signal modulated subcarrier to form a combined modulated subcarrier, transmitter means, means for modulating transmitter means utilizing said combined modulated subcarrier and said luminance signal, means for producing a second combined modulated subcarrier, said second combined modulated subcarrier having an arbitrary frequency, a dividing amplifier and detector means, means for coupling said dividing amplifier and detector means to said second combined modulated subcarrier and said luminance signal to yield a reference signal proportional to the color saturation level, amplitude control amplifier, responsive to said reference signal and operatively connected to control the amplitude level of said Q-signal after leaving said matrix proportional to said color saturation level according to a prescribed relationship.

29. In a color television transmitter including means for resolving the television image to be transmitted into three primary color signals, matrix means utilized for combining said three primary color signals in prescribed amount to form a luminance signal, an I-signal, and a Q-signal, subcarrier developing and modulation means utilizing said I and Q signals for developing a Q-signal modulated subcarrier and an I-signal modulated subcarrier, Q-filter means, means for utilizing said Q-filter means to filter said Q-signal modulated subcarrier, I-filter means, means for utilizing said I-filter means for filtering said I-signal modulated subcarrier, means for combining said filtered I-signal modulated subcarrier and said filtered Q-signal modulated subcarrier to form a combined modulated subcarrier, transmitter means, means for modulating transmitter means utilizing said combined modulated subcarrier and said luminance signal, means for automatically controlling the level of the Q-signal as a function of the level of color saturation described by the ratio of the amplitudes of the combined modulated subcarrier and the luminance signal comprising in combination, means for developing a second Q-signal modulated subcarrier and a second I-signal modulated subcarrier, a second I-filter means, a second Q-filter means, means utilizing said second I-filter means and said second Q-filter means for combining said second Q-signal modulated subcarrier and said second I-signal modulated subcarrier to form a second combined modulated subcarrier, a dividing amplifier and detector means, means for coupling said dividing amplifier and detector means to said second combined modulated subcarrier and said luminance signal to yield a reference signal proportional to the color saturation level, amplitude control amplifier responsive to a control signal, means for coupling said amplitude control amplifier to said Q-signal issuing from said matrix whereby the amplitude of said Q-signal as utilized in said subcarrier developing and said modulation means is subject to control by said amplitude control amplifier, means for coupling said reference signal from said dividing amplifier and detector means for use as a control signal for said amplitude control amplifier whereby the amplitude level of said Q-signal after leaving said matrix is made to be proportional to said color saturation level according to a prescribed relationship.

30. In a color television transmitter including means for resolving the television image to be transmitted into three component color signals, the combination of, matrix means utilized for combining said three component color signals in prescribed amounts to form a luminance signal, a first color signal, and a second color signal, said first color signal describing a gamut of colors prescribed for maximum acuity of the eye, said second color signal describing a gamut of colors prescribed for lesser acuity of the eye, subcarrier developing and modulation means adapted to be modulated by both said first color signals and said second color signals to develop a first color signal modulated subcarrier and a second color signal modulated subcarrier, second color signal filter means, means for utilizing said second color signal filter means to filter said second color signal modulated subcarrier, first color filter means, means for utilizing said first color signal filter means for filtering said first color signal modulated subcarrier, means for combining said filtered first color signal modulated subcarrier and said filtered second color signal modulated subcarrier to form a combined modulated subcarrier, transmitter means, means for modulating the carrier of said transmitter means utilizing said combined modulated subcarrier and said luminance signal, a second subcarrier developing and modulation means adapted to be independently modulated by both said first color signals and said second color signals to develop an independent second color signal modulated subcarrier and an independent first signal modulated subcarrier, an independent first color signal filter means, an independent second color signal filter means, means for combining said independent second color signal modulated subcarrier and said indepedent first color signal modulated subcarrier to form an independent combined modulated subcarrier, a dividing amplifier and detector means, means for coupling said dividing amplifier and detector means to said independent combined modulated subcarrier and said luminance signal to yield a reference signal proportional to the color saturation level, amplitude control amplifier responsive to a control signal, means for utilizing said amplitude control amplifier to control the amplitude of said second color signal in said first color signal modulated subcarrier, means for coupling said reference signal from said dividing amplifier and detector means for use as a control signal for said amplitude control amplifier to cause the amplitude level of said first color signal modulated subcarrier to be proportional to said color saturation level according to a prescribed relationship.

31. The invention as set forth in claim 28 and wherein said color saturation level is approximated by the relative amplitude level of said second combined modulated subcarrier.

32. The invention as set forth in claim 29 and wherein said color saturation level is approximated by the relative amplitude level of said second combined modulated subcarrier.

33. In a color television transmitter including means for resolving the television image to be transmitted into three primary color signals, the combination of, matrix means utilized for combining said three primary color signals in prescribed amount to form a luminance signal, an I-signal, and a Q-signal, subcarrier developing and modulator means adapted to be modulated by both said I-signals and said Q-signals to develop a Q-signal modulated subcarrier and an I-signal modulated subcarrier, Q-filter means, means for utilizing said Q-filter means to filter said Q-signal modulated subcarrier, I-filter means, means for utilizing said I-filter means for filtering said I-signal modulated subcarrier, means for combining said filtered I-signal modulated subcarrier and said filtered Q-signal modulated subcarrier to form a combined modulated subcarrier, transmitter means, means for modulating the carrier of said transmitter means utilizing said combined modulated subcarrier and said luminance signal, threshold level responsive pass circuit which passes signals having an amplitude level above a prescribed threshold level and stops those signals with amplitude levels below their prescribed threshold level, means for causing said Q-signal modulated subcarrier to be channeled through said threshold level responsive pass circuit prior to being combined with said I-signal modulated subcarrier, means utilizing said threshold responsive pass circuit to stop said Q-signal modulated subcarrier should the amplitude level of said Q-signal modulated subcarrier fall below said prescribed threshold level.

34. The invention as set forth in claim 33 and wherein said threshold level responsive pass circuit consists of a bias potential source, a back-to-back clipping circuit, an input circuit and an output circuit, said back-to-back clipping circuit consisting of two diodes connected back-to-back and a resistance-condenser network, means for coupling said back-to-back clipping circuit and said bias potential source between said input circuit and said output circuit whereby signals of amplitude below a prescribed threshold level do not pass through said back-to-back clipping circuit while signals with amplitude above said prescribed threshold level do pass.

35. In a color television transmitter including means for resolving the television image to be transmitted into three primary color signals, the combination of, a matrix means utilized for combining said three primary color signals in prescribed amount to form a luminance signal, an I-signal, and a Q-signal, subcarrier developing and modulator means adapted to accept both said I-signals and said Q-signals and to develop a Q-signal modulated subcarrier and an I-signal modulated subcarrier, Q-filter means, means for utilizing said Q-filter means to filter said Q-signal modulated subcarrier, I-filter means, means for utilizing said I-filter means for filtering said I-signal modulated subcarrier, means for combining said filtered I-signal modulated subcarrier and said filtered Q-signal modulated subcarrier to form a combined modulated subcarrier, transmitter means, means for modulating the carrier of said transmitter means utilizing said combined modulated subcarrier and said luminance signal, a dividing amplifier and detector means, circuit means for determining said relative difference in amplitude between the highest primary color level and the lowest primary color level, means for coupling the output of said circuit means and said luminance signal to said dividing amplifier and detector means to develop a reference signal proportional to said color saturation level, an amplitude control amplifier, said amplitude control amplifier responsive to a control signal, means for operatively connecting said amplitude control amplifier to provide control of the amplitude of said Q-signal, means for coupling said reference signal from said dividing amplifier and detector means into said amplitude control amplifier whereby the level of said Q-signal is made a prescribed function of said color saturation level.

36. In a color television transmitter including means for resolving the television image to be transmitted into three primary color signals, the combination of, matrix means utilized for combining said three primary color signals in prescribed amount to form a luminance signal, an I-signal, and a Q-signal, subcarrier developing, and modulator means adapted to be quadrature modulated by both said I-signals and said Q-signals, said quadrature modulation yielding a Q-signal modulated subcarrier and an I-signal modulated subcarrier, Q-filter means, means for utilizing said Q-filter means to filter said Q-signal modulated subcarrier, I-filter means, means for utilizing said I-filter means for filtering said I-signal modulated subcarrier, means for combining said filtered I-signal modulated subcarrier and said filtered Q-signal modulated subcarrier to form a combined modulated subcarrier, transmitter means, means for modulating the carrier of said transmitter means utilizing said combined modulated subcarrier and said luminance signal, a dividing amplifier and detector means, circuit means for determining said relative difference in amplitude between the highest primary color level and the lowest primary color level, means for coupling the output of said circuit means and said luminance signal to said dividing amplifier and detector means, said dividing amplifier and detector means to develop a reference signal proportional to said color saturation level, amplitude control amplifier responsive to a control signal, means for utilizing said amplitude control amplifier to provide control of the amplitude of said Q-signal modulated subcarrier, means for coupling said reference signal from said dividing amplifier and detector means into said amplitude control amplifier whereby the level of said Q-signal is made a prescribed function of said color saturation level.

37. The invention as set forth in claim 35 and wherein said luminance signal as applied to said dividing amplifier and detector means is obtained from a second matrix means, said second matrix means adjustable to yield a luminance signal of component primary colors of prescribed brightness levels.

38. In combination: a first circuit to provide a plurality of different signals representative of a plurality of colors included at each incremental area of a color image, said plurality of signals in combination representative of a number of colors and having signal characteristics which are indicative of the level of color saturation at each incremental area and from which can be derived a control signal indicative of the color saturation of each incremental area; a second circuit coupled to said first circuit to derive said control signal, a third circuit coupled to said first circuit and comprising a multiplicity of different signal channels through which different ones of said different signals are translated; and means coupled between said second and third circuits and responsive to said control signal to alter the signal strength of at least one of said signals in one of said signal channels whereby the number of colors represented by the signals translated through said different signal channels is altered in accordance with said level of color saturation.

39. In combination; a first circuit to provide a first signal representative of different colors at each incremental area of a color image including a signal representative of color information along a green-purple color axis, said first signal having characteristics which are representative of the level of color saturation at each incremental area of said color image and from which can be derived a control signal having an amplitude related to the level of color saturation of each incremental area; a second circuit operatively connected to said first circuit to derive therefrom said control signal responsive to said characteristics of said first signal and indicative of the level of color saturation at each incremental area; a third circuit operatively connected to said first circuit and comprising apparatus to process said signal representative of color information along said green-purple axis; and means coupled to said second circuit and responsive to said control voltage and operatively connected to said third circuit to disable said third circuit when said level of color saturation falls below a predetermined level.

40. In a color image reproducing system adapted for reproducing a color image consisting of component areas, each of said component areas represented by a plurality of colors and characterized by a color saturation, said color saturation related to the intensity of each of said plurality of colors, the combination of, first means to provide a plurality of signals representative of said plurality of colors, a color image reproducer coupled to said first means, circuit means coupled between said first means and said color image reproducer to translate said plurality of signals to said color image reproducer, second means coupled to said first means to develop an electrical signal representative of the color saturation of each component area of said color image, and means coupled to said second means and responsive to said electrical signal and operatively connected to said circuit means to control the amplitude level of at least one of said plurality of signals being translated in said circuit means.

41. In a color television circuit adapted to provide different signals representative of a plurality of different colors and which represent a color image, said color image having at each incremental area a color saturation having a level determinable from the amplitudes of at least one of said different signals, the combination of: a plurality of different signal translating circuits, means to apply a different one of said signals to each of said signal translating circuits, a signal combining circuit coupled to the output of said plurality of different signal translating circuits to combine signals translated therein to produce color information representative of a number of said different colors representative of said color signal related to the number of translated signals, means responsive to the amplitude levels of prescribed ones of said different signals to produce a control signal representative of the level of color saturation of each incremental area of said color image, and means coupled to said last named means and to predetermined ones of said signal translating circuits and responsive to said control signal to control the relative ratio between the amplitudes of signals translated through said plurality of signal translating circuits to control the number of colors of said color image represented by said color information in said signal combining circuit.

42. In a color television system wherein a subject is scanned point-by-point to produce signals including a luminance signal and chrominance signals representative of saturation along a first chromaticity hue axis to which the human eye is relatively more acute and along a second axis to which the eye is relatively less acute, and wherein said signals are utilized to reproduce an image of said subject, means to reduce visible distortions in the reproduced image, such as green-purple edge effects, which are due to system bandwidth and circuit limitation, comprising: a luminance signal channel, a first channel for signals corresponding to said first chromaticity axis, a second channel for signals corresponding to said second chromaticity axis, control signal generating means coupled to at least one of said channels to develop a control signal varying in accordance with the point-by-point color saturation of the subject scanned, and means coupling said control signal generating means solely to said second channel to employ said control signal to reduce the signal therein whenever the saturation of scanned elemental areas falls below a predetermined threshold, whereby the reproduced image is limited to two colors along said first axis when the elemental chrominance is of low saturation.

43. In a color television system wherein a subject is scanned point-by-point to produce signals including a luminance signal and chrominance signals representative of saturation along a first chromaticity hue axis to which the human eye is relatively more acute and along a second axis to which the eye is relatively less acute, and wherein said signals are utilized to reproduce an image of said subject, means to reduce visible distortions in the reproduced image, such as green-purple edge effects, which are due to system bandwidth and circuit limitation, comprising, in combination: a luminance signal channel, a first channel for signals corresponding to said first chromaticity axis, a second channel for signals corresponding to said second chromaticity axis, control signal generating means coupled to said luminance channel and at least one of said chrominance channels to develop a control signal varying in accordance with the point-by-point color saturation of the subject scanned as represented by the ratio of chrominance to luminance, and means coupling said control signal generating means solely to said second channel to employ said control signal to reduce the signal therein whenever the saturation of scanned elemental areas falls below a predetermined threshold, whereby the reproduced image is limited to two colors along said first axis when the elemental chrominance is of low saturation.

(References on following page)

References Cited in the file of this patent

UNITED STATES PATENTS

| | | |
|---|---|---|
| 2,635,140 | Dome | Apr. 4, 1953 |
| 2,716,151 | Smith | Aug. 23, 1955 |
| 2,734,940 | Loughlin | Feb. 14, 1956 |
| 2,754,356 | Espenlaub | July 10, 1956 |

OTHER REFERENCES

Introduction to Color Television, Admiral Corp., 1954, Chicago, Ill., pages 17 to 27.

Compatible Color TV Receiver, K. E. Farr, pages 98 to 104, Electronics, January 1953.

Design Techniques for Color Television Receiver, pages 136 to 143, Electronics, February 1954.